(12) United States Patent
Davison et al.

(10) Patent No.: US 6,400,687 B1
(45) Date of Patent: Jun. 4, 2002

(54) ATM NETWORK MANAGEMENT

(75) Inventors: Robert G. Davison; Manoocherhr Azmoodeh; James J. Hardwicke, all of Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/117,095

(22) PCT Filed: Jun. 12, 1997

(86) PCT No.: PCT/GB97/01591

§ 371 (c)(1),
(2), (4) Date: Sep. 23, 1998

(87) PCT Pub. No.: WO97/48214

PCT Pub. Date: Dec. 18, 1997

Related U.S. Application Data

(63) Continuation-in-part of application No. 08/730,004, filed on Oct. 11, 1996, now abandoned.

(30) Foreign Application Priority Data

Jun. 13, 1996 (GB) .............................. 9612363

(51) Int. Cl.⁷ ................................. H04J 3/24

(52) U.S. Cl. ..................... 370/236; 370/230; 370/252; 370/395.2; 370/395.4; 370/400; 370/465; 379/265.02; 379/266.02

(58) Field of Search ................................ 370/230, 234, 370/235, 236, 252, 395, 396, 397, 399, 400, 409, 410, 454, 455, 465, 395.2, 395.21, 395.4, 395.41, 395.42, 395.43, 395.7, 395.71; 379/265.1–265.09, 266.1–266.09, 309

(56) References Cited

U.S. PATENT DOCUMENTS

| 5,251,209 A | | 10/1993 | Jurkevich et al. ............. 370/82 |
| 5,347,511 A | | 9/1994 | Gun ............................ 370/54 |
| 5,408,465 A | | 4/1995 | Gusella et al. ................ 370/17 |
| 5,491,694 A | * | 2/1996 | Oliver et al. ................ 370/455 |
| 5,530,695 A | | 6/1996 | Dighe et al. .................. 370/17 |
| 5,633,859 A | | 5/1997 | Jain et al. .................... 370/234 |
| 5,825,869 A | * | 10/1998 | Brooks et al. .............. 379/265 |
| 6,021,263 A | * | 2/2000 | Kujoory et al. ............. 370/409 |

OTHER PUBLICATIONS

IEICE Transactions on Communications, vol. E77–B, No. 1, Jan. 1, 1994, pp. 5–14, Kawamura et al, "Fast VP–Bandwidth Management with Distributed Control in ATM Networks".

Serving Humanity Through Communications Supercomm/ICC, New Orleans, May 1–5, 1994, vol. 1, No.–, May 1, 1994, Institute of Electrical and Electronics Engineers, pp. 44–50, Bolla et al. "A Distributed Routing and Access Control Scheme for ATM Networks".

IEICE Transactions on Communications, vol. E75–B, No. 10, Oct. 1, 1992, pp. 1071–1080, Logothetis et al, "Centralized Virtual Path Bandwidth Allocation Scheme for ATM Networks".

* cited by examiner

*Primary Examiner*—Douglas Olms
*Assistant Examiner*—Shick Hom
(74) *Attorney, Agent, or Firm*—Nixon & Vanderhye P.C.

(57) ABSTRACT

A management system for an ATM virtual path network in which the physical connections are provided by broadband links between ATM switches. The management system measuring current network load in individual links and virtual paths, and comprising sets of inter-communicating distributed agents for carrying out management in response to measured load and management requirements.

29 Claims, 18 Drawing Sheets

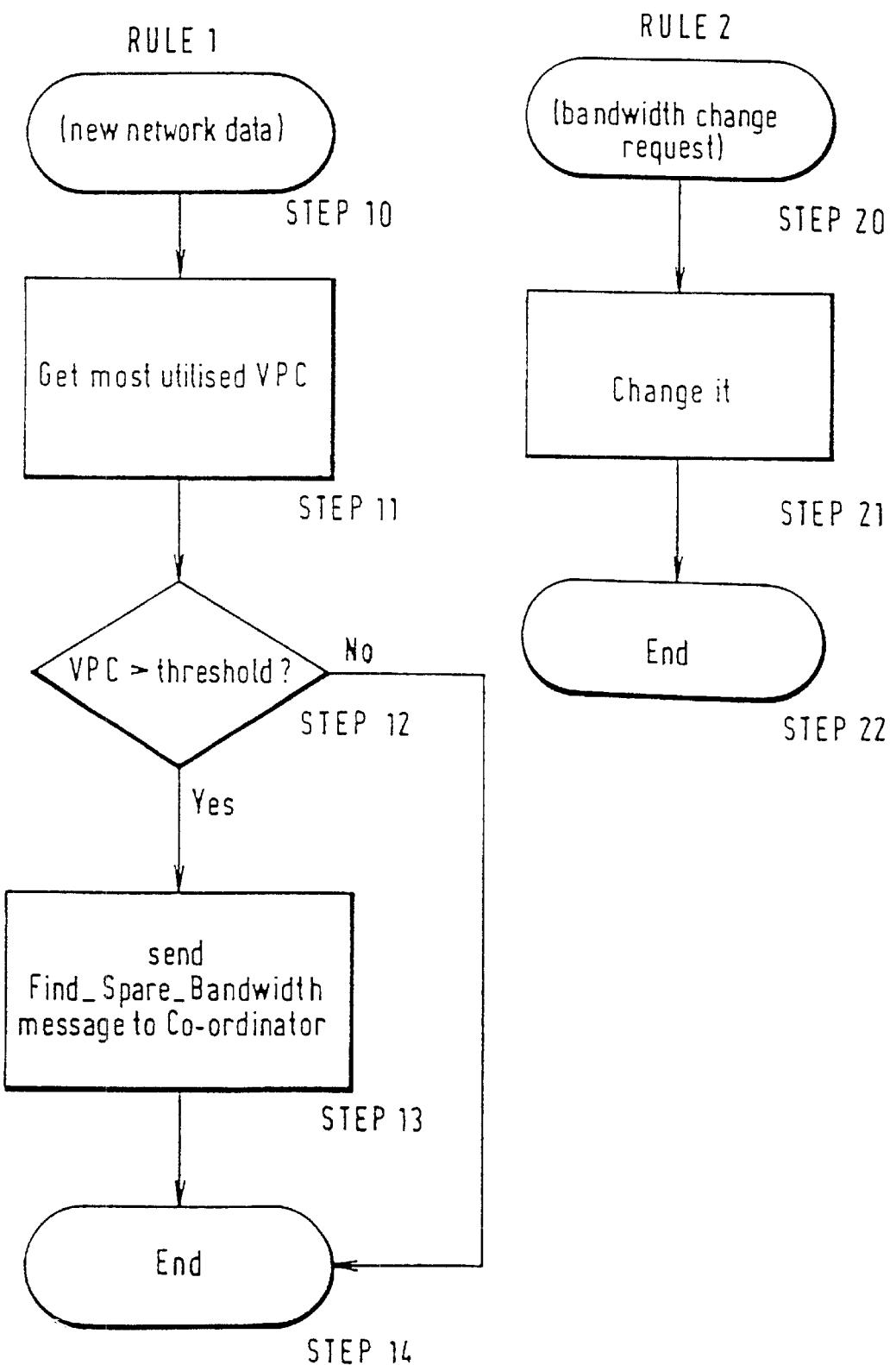

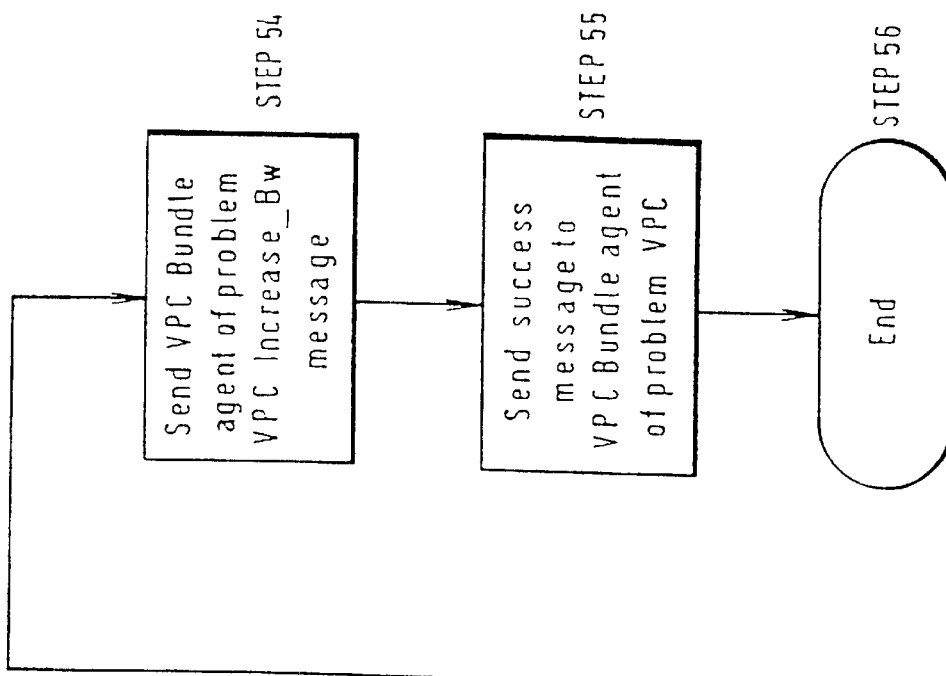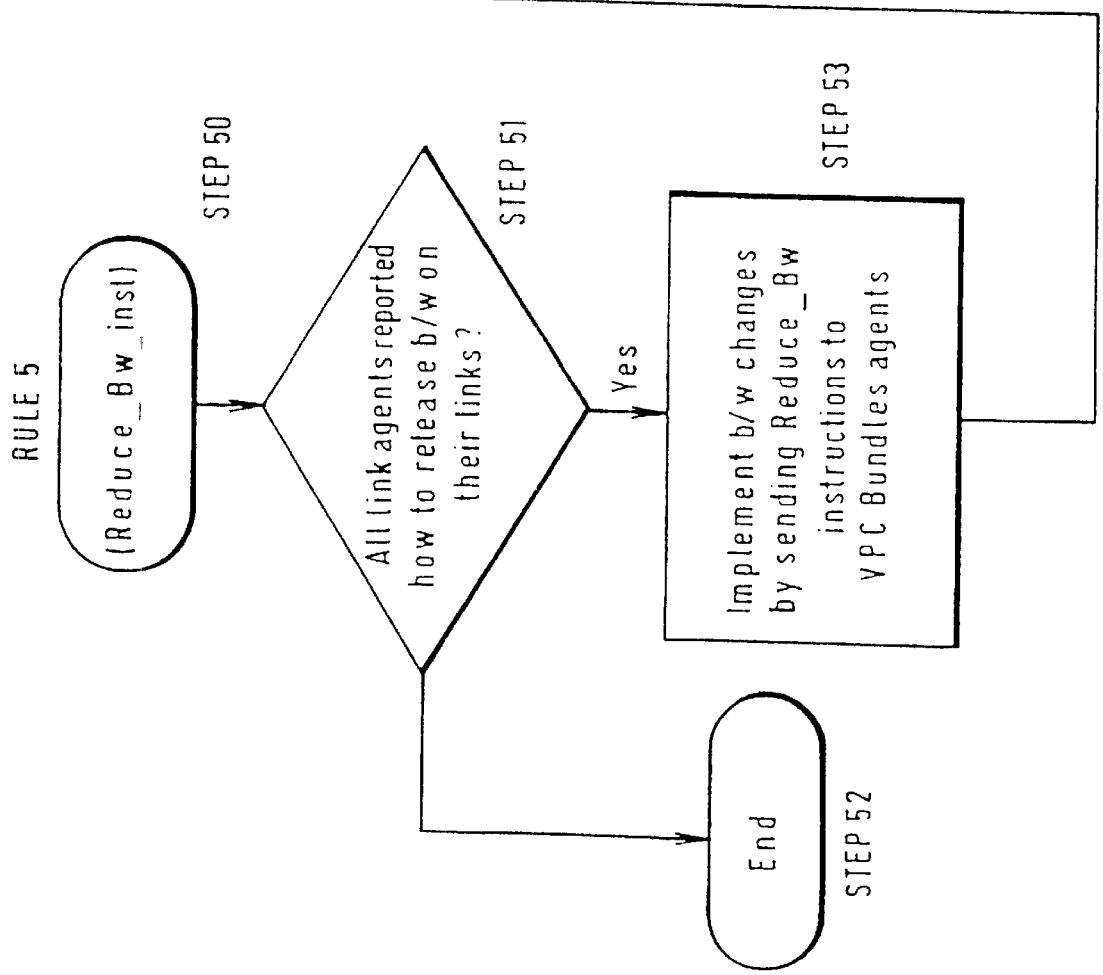
FIG. 6C

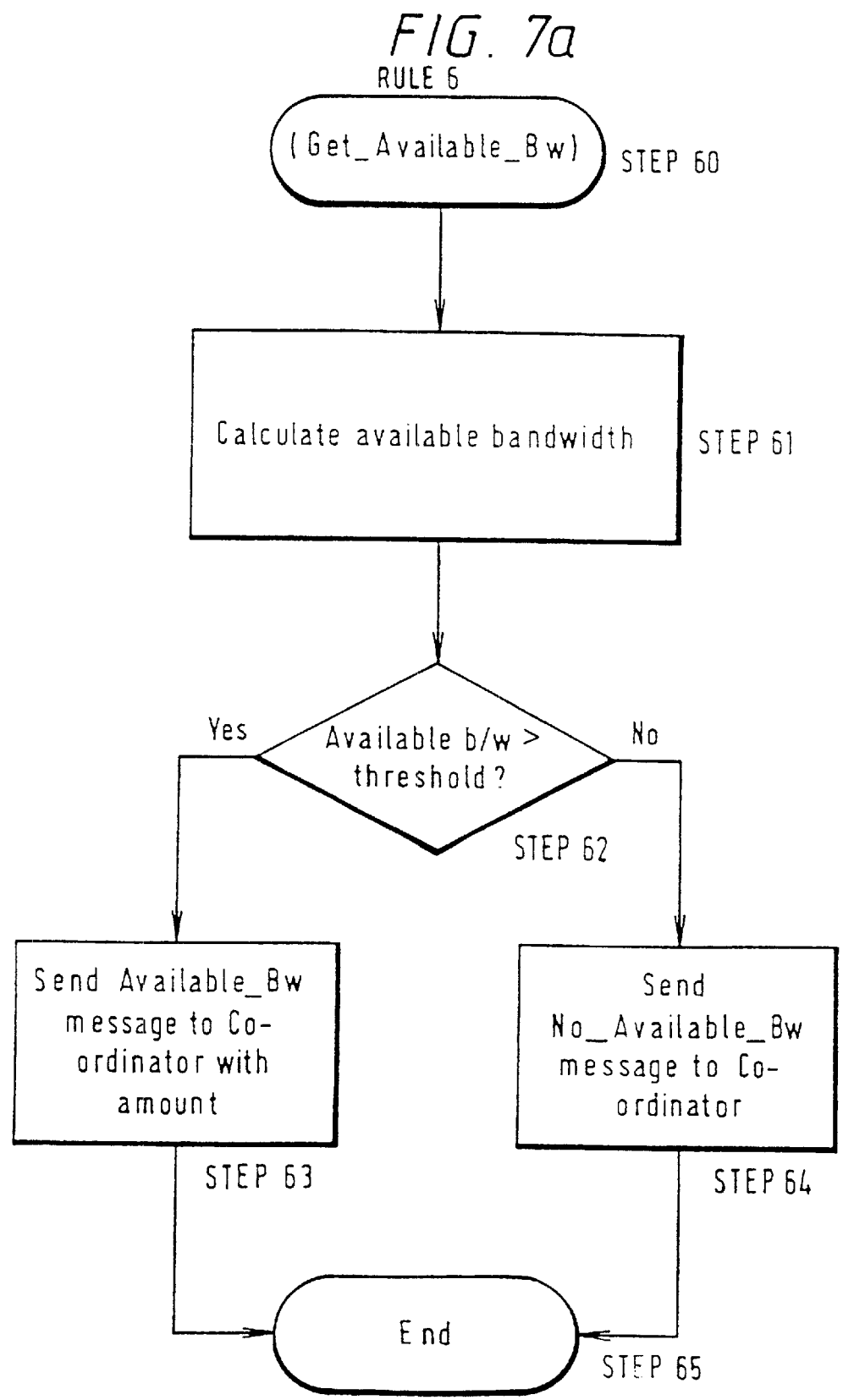

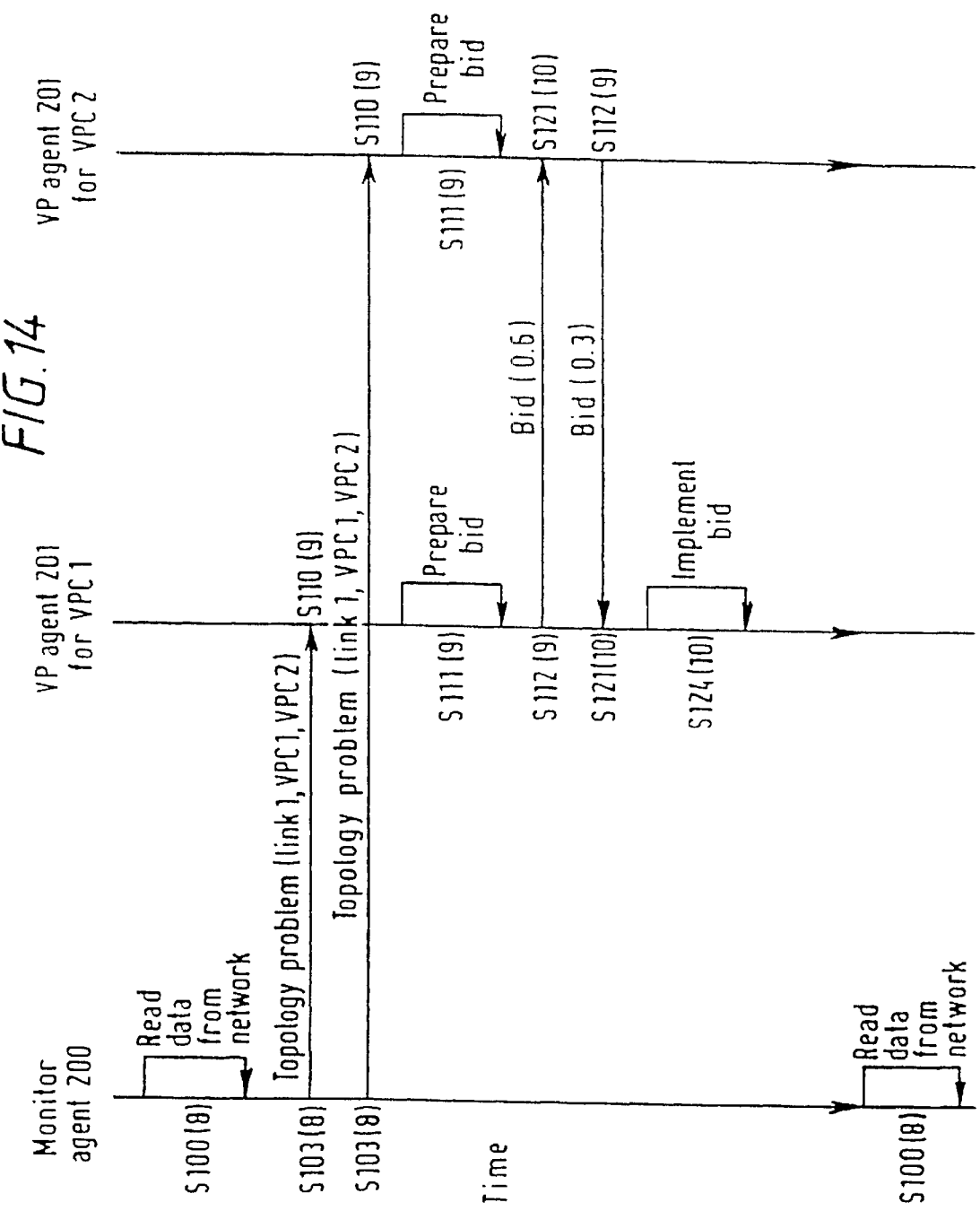

ATM NETWORK MANAGEMENT

RELATED APPLICATIONS

This is a continuation-in-part of our earlier copending commonly assigned application Ser. No. 08/730,004, filed Oct. 11, 1996 now abandoned.

BACKGROUND OF THE INVENTION

The present invention concerns the performance management and traffic control of what are known as asynchronous transfer mode (ATM) networks.

The arrival of broadband networks heralded by the introduction of optical fibres has substantially increased the range and nature of data which can be transmitted over telephone lines. Thus while some users may be content with merely maintaining voice connections at constant bit rates, other users might wish to have access to other connection types such as video and data at variable bit rates. Thus users now require the ability to select from a number of connection types in accordance with their needs. ATM networks have been developed to meet this demand. In a typical case a user can choose between three potential connection types, namely the already mentioned two megabit voice links, a variable bandwidth link peaking at 10 megabits and with a mean of 5 megabits, and a third variable bandwidth link peaking at 20 megabits and having a mean of 8 megabits. The second of these connection types can be used for high speed data transfer and the third for the transmission of video images. It will however be appreciated that the present invention is not limited to any particular set of connection types.

FIG. 1 of the accompanying drawings is a functional representation of user and service interaction in a typical ATM network environment. Layer 100 represents the users and layer 101 represents suppliers who provided value added services to users. Layer 102 gives some examples of value added network services such as additional telephoning features, provision of video data, transfer of data files and the like, and layer 103 shows the various functional layers of the actual ATM network.

The basic unit of an ATM network is the ATM switch. Such a switch will be described in greater detail hereinafter but each switch supports several hundred users and provides the requisite links between the users and other ATM switches in the network. In order to maximise the potential bandwidth available to users the telecommunications industry has developed what are known as virtual path (VP) networks. VP networks differ in two ways from the traditional telephone network. In a traditional telephone network when a user wishes to access another user a fixed channel is established via the various nodes and switches and this channel either has the ability to carry the data or not. In a VP network each user is allocated a bandwidth appropriate to his assumed needs in the various connection types and the ATM network management provides bandwidth by selecting a route from all of the available paths in the network. Of course each user will have a usage pattern which will be only partly predictable. It will be appreciated that it would be uneconomic to provide each user all the time with all of the maximum bandwidth that that user might require. Accordingly, in a VP network the sum of the nominal bandwidths allocated to the users connected in the network is substantially greater than the total bandwidth of the network. Thus if every user utilised its bandwidth to the maximum at the same time the network would be unable to cope. Accordingly, a major problem with the management of ATM networks involving virtual paths is to balance the requirement to utilise the capacity of the network to its maximum whilst at the same time maintaining the quality of service (QoS) offered to the subscribers to the network. Fundamental attributes of QoS are delay, loss and delay variation.

When discussing ATM networks certain terms have become standard. Thus a link is an ATM transmission path which provides bandwidth between transmission end points. Normally such a link will be a fibre optic one. A number of transmission paths and transmission end points form the transmission capability of the network which is provided to the virtual path (VP) level. The transmission end points are ATM switches which route traffic over VP links.

A concatenation of VP links is terminated by VP connection end points to form VP connections which are simply called VPs in the remainder of this specification. VPs enable the ATM transport network to provide either teleservices to end users via the network service service suppliers at layer 102. In each of these cases, a set of VPs are provided to the VC level such that at this level, VPs are interconnected by VC links. The resulting concatenation of VC links form a VC connection which are used to transport these teleservices. Nodes, links and VP's can all be considered as network resources and in a typical network each is represented by a distributed object. Thus information concerning the network can be obtained by calling function acting on these distributed objects. The importance of this arrangement to the present invention will become apparent hereinafter.

More than one connection is usually used to provide an end-to-end service association or call to a user/customer of the network. Each of the connections in a call have certain characteristics such as bandwidth utilisation profile and performance targets that it shares with other connections of the same type.

The performance management of a network layer can be broadly classified into two groups—Network Resource Management (NRM) and Traffic Control Management (TCM). NRM deals with VP bandwidth management, VP routing, virtual channel (VC) routing strategies, VP and link load balancing, VP Topology Management and quality of service (QoS) verification. However the performance management in ATM networks is an extremely complex problem due to many factors. Amongst these are the fact that each user has the potential of a plurality of connection types and because of the VP model of the network the combination of the number of different connection types with the number of potential virtual paths between the ATM switches in the network rapidly becomes extremely large. Adding to the problem is the variability of the traffic characteristics and controls at many levels together with the necessity to plan ahead for substantially larger networks. Thus in an ATM network Virtual Path Bandwidth Management (VPBM) is both a very important function and one which in practice is difficult to carry out.

In dealing with the above problems in VPBM, it must be borne in mind that the theory of performance management functionality as part of an integrated Telecommunications Management Network (TMN) using ATM switches and virtual paths is in general not well understood. This contrasts with the well-founded mathematical models such as queuing theory, etc., for assessing and analysing the performance of orthodox telephone networks.

To summarise, virtual path bandwidth management as applied to ATM networks is a network management function which aims to ensure that virtual paths have the right size, allocation and route. The difficulties of carrying out this function include:

the vast number of virtual paths needed for future public ATM networks leading to a need for scalable algorithms and implementations;

impossibility of accurate traffic models for future services—ATM networks allow applications to produce traffic at continuously varying rates preventing accurate models needed for optimal solutions and changing business requirements. Thus, network providers want to be able to easily modify how they control their networks. For example a provider may want to offer more reliable QoS, with corresponding lower network utilisation, at premium times than at economy times. This requires algorithms for bandwidth tuning which can be adapted to change policies. Additionally there is a lack of accurate traffic models on which such algorithms can be based.

A known approach in dealing with the problem of monitoring traffic in ATM networks and adaptively changing the bandwidths of VPs to accommodate the required load of VCs is a centralised one in which for bandwidth allocation only the VP termination points are involved. The telecommunication management network (TMN) decides the bandwidth required and downloads this information to the VP termination points. However with increasing network sizes the computing power required to carry out effective adaptation of the bandwidth allocation becomes too great and the time penalties involved become too severe to enable the network to be updated except at relatively long intervals and with great effort.

An article entitled "Fast VP-Bandwidth Measurement ith Distributed Control in ATM Networks" in IEICE Transactions on Communications, vol E77-B, No 1, Jan. 1, 1994 pages 5–14 discloses a management system where the control is carried out within the switches. A similar switch based system is disclosed in an article entitled "Serving Humanity Through Communications", Supercomm/ICC New Orleans, May 1–5, 1994, Institute of Electrical and Electronics Engineers, pages 44–50.

Neither of these documents provides a solution to the problems set out hereinbefore.

The present invention is concerned with providing a solution to the above problems. Thus one concern of the present invention is to provide a system for managing bandwidth in an ATM network.

However a solution concerning bandwidth cannot by itself deal with all potential problems of ATM management. A major problem can arrive when the distributed agents have to deal with the following situation. This is when for a particular link:

a) The link capacity has all been reserved by the VP's it carries.

b) All the VPs it carries are using all their reserved bandwidth.

c) One or more of those VPs require more bandwidth than their currently reserved bandwidth.

Thus the present invention is concerned with providing a generic approach to a range of problems in ATM management.

In accordance with one aspect of the present invention there is provided a management system for an ATM virtual path network in which the physical connections are provided by broadband links between ATM switches, and comprising means for measuring current network load in individual links and virtual paths, and sets of inter-communicating distributed agents for carrying out management in response to measured load and management requirements.

In accordance with a second aspect of the present invention there is provided a method of managing an ATM virtual path network in which the physical connections are provided by broadband links between ATM switches, and comprising measuring current network load in individual links and virtual paths, and utilising sets of inter-communicating distributed agents for carrying out management in response to measured load and management requirements.

In order that the present invention may be more readily understood embodiments thereof will now be described by way of example and with reference to the remainder of accompanying drawings, in which:

FIG. 5 shows flow diagrams of two rules which control the behaviour of one of the agents shown in FIG. 4;

FIGS. 6A, 6B and 6C show flow diagrams of three rules which control the behaviour of a second agent of the three agents shown in FIG. 4;

FIGS. 7A and 7B show flow diagrams of two rules which control the behaviour of the third of the agents shown in FIG. 4;

FIG. 14 is a sequence of messages used in system Topology Management; and

Figure 1:
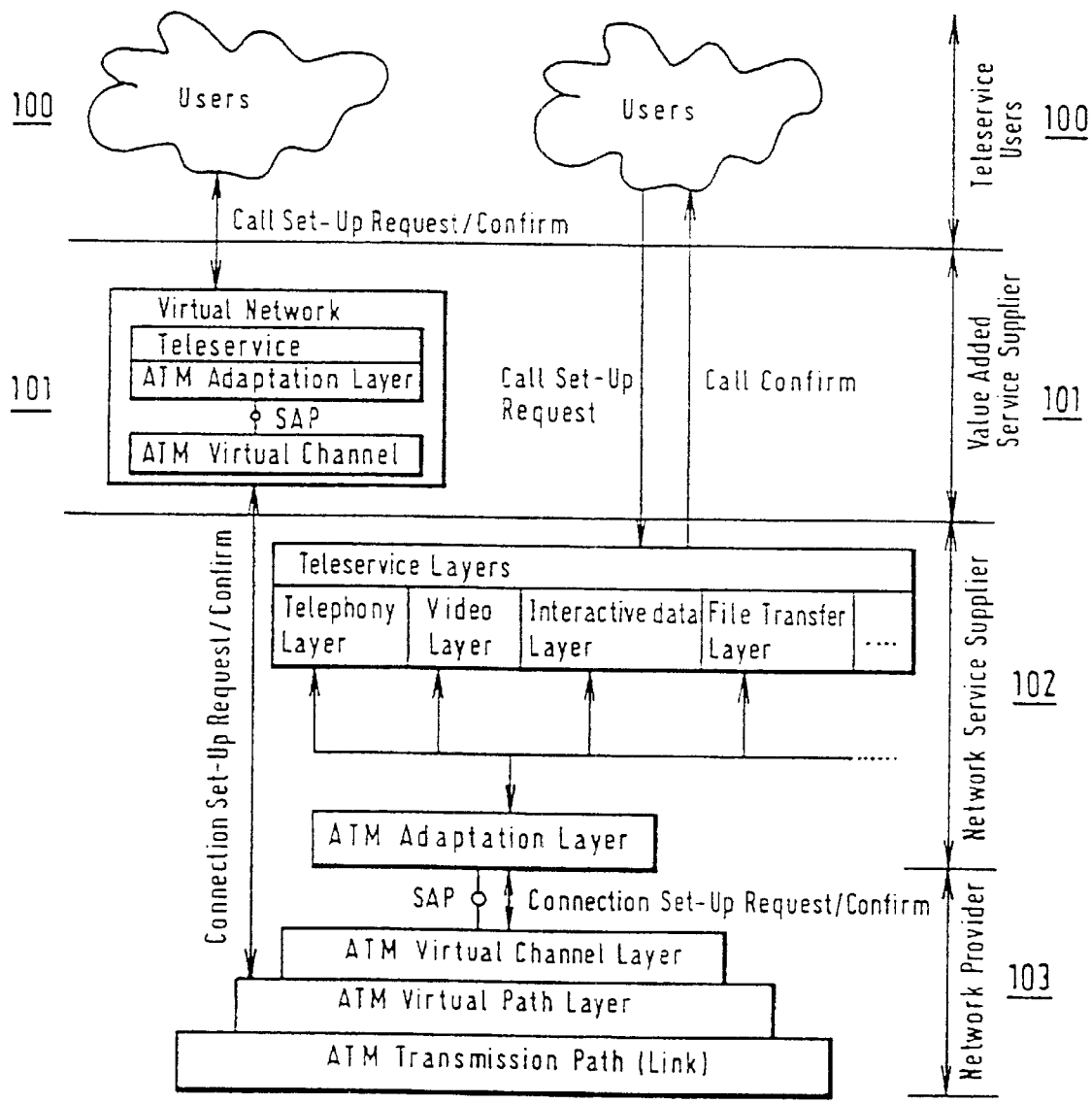
FIG. 1 is a functional representation of user and service interaction in a typical ATM network environment.
Figure 2:
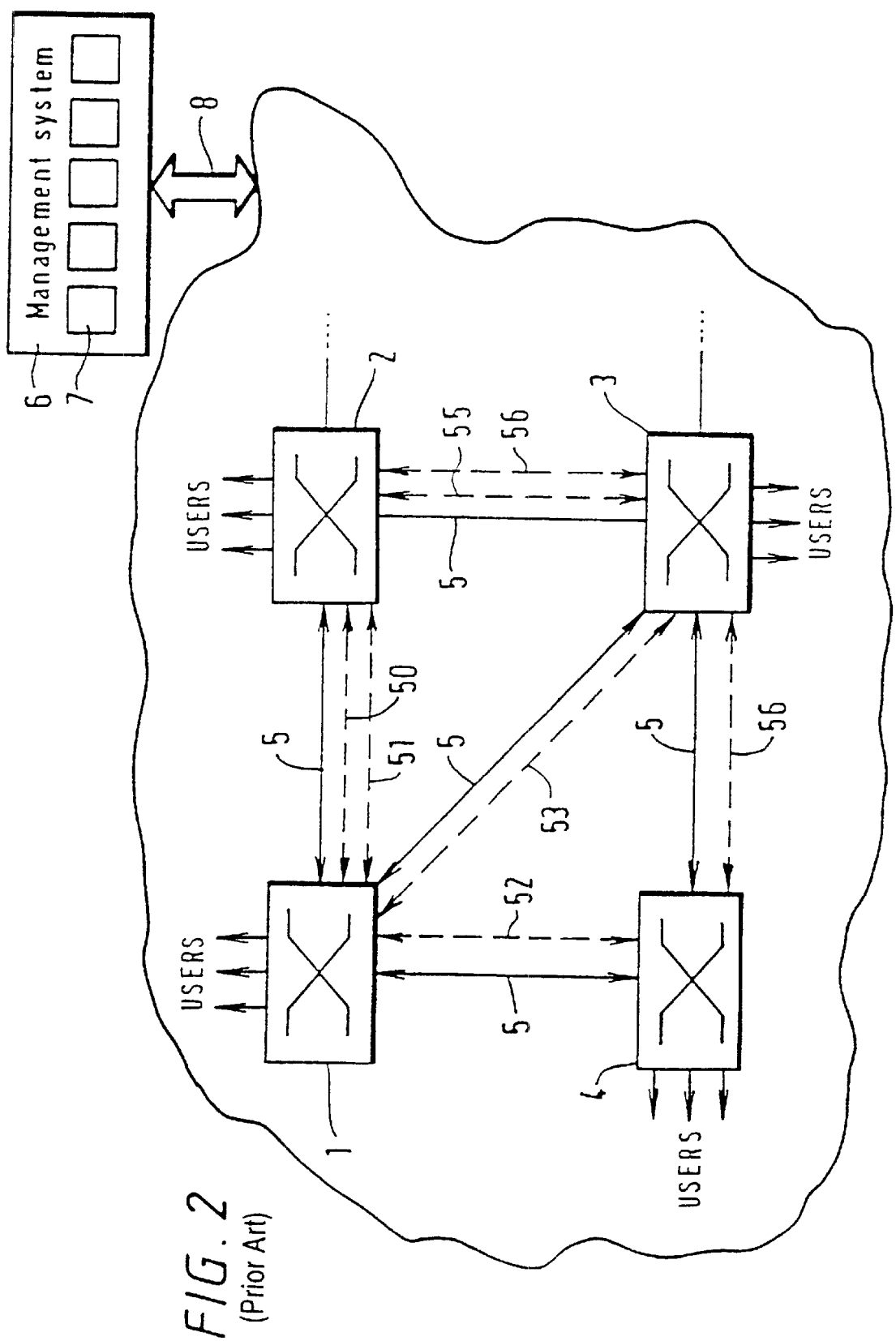
FIG. 2 is a diagrammatic representation of a basic ATM network.

Referring now to FIG. 2 of the accompanying drawings, this shows an ATM network consisting of four ATM switches 1, 2, 3 and 4. In the present embodiment high bandwidth links are provided between the switches by optical fibres indicated at 5. It will be seen that switch 1 is connected directly to switches 2 and 4 and also to switch 3, whilst switches 2 and 4 are respectively connected to 1 and 3. As already mentioned, each switch will support several hundreds of users and each user in this embodiment has the potentiality of three different connection types with each connection type having a different bandwidth allocated by the VP bandwidth naturally. Thus in the present embodiment each of the links 5 is capable of carrying the three different connection types which have already been discussed. The number and range of connection types can, of course, be varied. In the Figure numerals 50 to 56 represent VPs carried over the links 5. VP56 can be considered as providing a direct path between switches 2 and 4. In a physical sense VP56 passes through switch 3 but cannot terminate at switch 3. Thus in effect it does provide a direct path between switch 2 and switch 4. The provision of VPCs of this type is a decision of the management function and will depend on, for example, expected traffic volumes.

A management system is indicated at 6. This system comprises a plurality of programmable computers 7 and communicates with the network via an interface indicated at 8. This interface can comprise one or more VPs or virtual circuits. The function of the programmable computers will be described in greater detail hereinafter. It is conceivable that a single computer can be used in the management system. The number and range of connection types can be varied.

As an immediate example of the complexity which can arise with much larger ATM networks, it will be appreciated that using by VPs a user at switch 1 can access a user at switch 3 over a large number of different links and that if even this simple network was increased by the addition of a single additional ATM switch the number of potential routes would increase exponentially.

Figure 3:
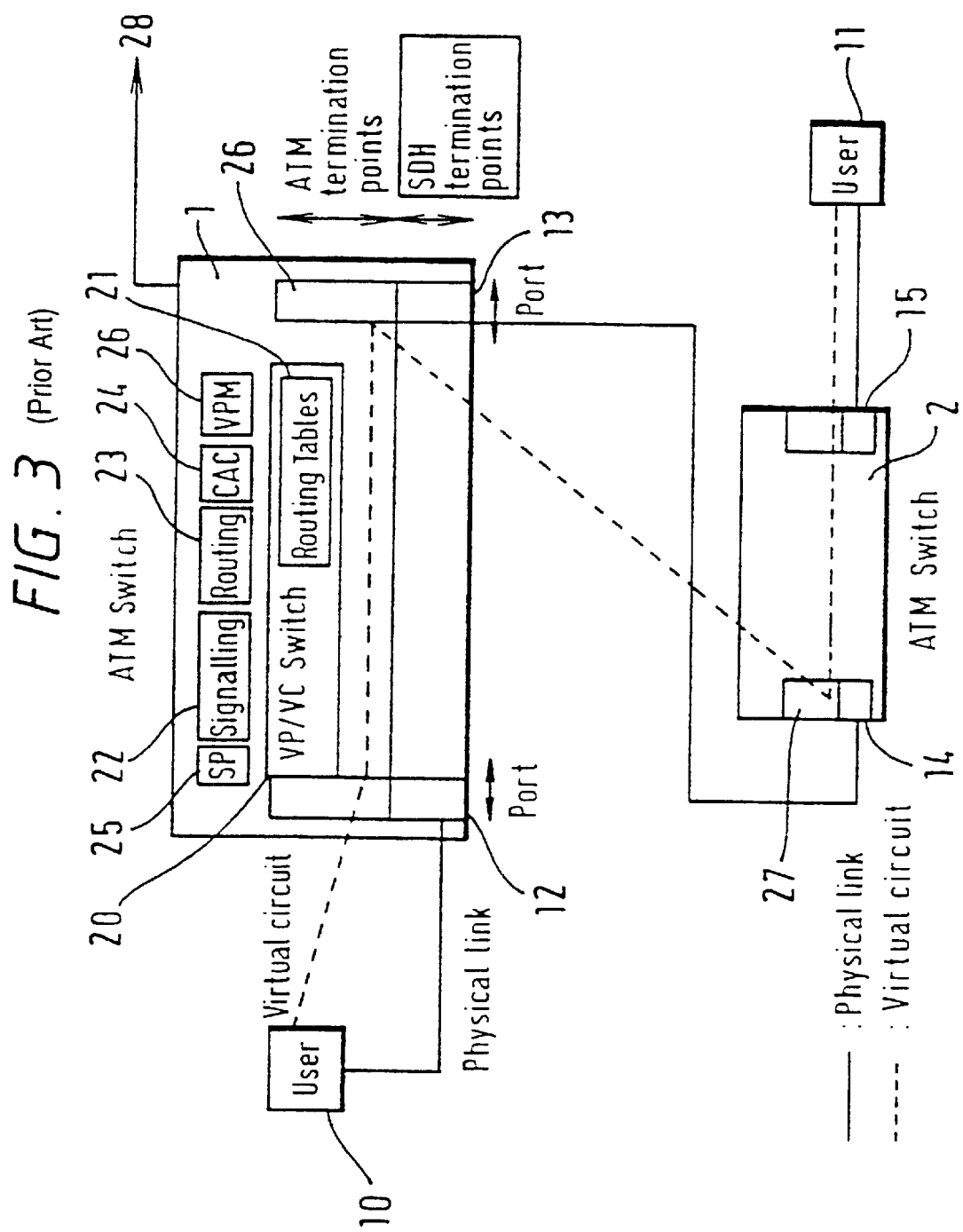
FIG. 3 is a diagrammatic view of an ATM switch.

Referring now to FIG. 3 of the accompanying drawings, this shows the functional architecture of an ATM switch. The physical structures of such switches are well-known in the art and extremely complex and accordingly will not be discussed in detail. FIG. 3 shows switch 1 linked to switch 2 of FIG. 2. A first user is indicated at 10, this user being physically linked to switch 1, and a second user is shown at 11, the second user being physically linked to switch 2. The physical links between user 10 and switch 1 are terminated by a port 12, the physical link between switch 1 and switch 2 is terminated by respective ports 13 and 14 and the physical link between user 11 and switch 2 is terminated by a port 15. Ports perform the function of line termination so that ATM cells arriving at a port are delivered to the switch and likewise the cells leaving the switch are delivered to the port for transmission. As the two switches are effectively identical only the functions available in switch 1 will be described. Thus at the switch VP/VC switching is carried out using appropriate routing tables in the figure the VP/VC switching function is indicated at 20 and the routing tables are indicated at 21. The call handling functions of the switch comprise signalling and routing strategies for VC routings and these are shown at 22 and 23. The connection acceptance control function (CAC) is shown at 24 and is responsible for accepting or rejecting a new connection onto the network depending on the available capacity left in the network. The source policing (SP) function shown at 25 ensures that users do not go above their contracted traffic volumes. Finally, the virtual path management (VPM) functions 26 of the switch are responsible for:

determining if there is sufficient bandwidth on a VP for a connection;
monitoring VP bandwidths thresholds so as to provide the data for VP tuning functions;
to allocate and de-allocate bandwidth at call set-up and call release time;
to respond to network management requests for creating and deleting VPs and for changing their properties such as bandwidth, etc.

In order to carry out these functions the switch is connected via a path indicated at 28 to the management system 6.

In the switch shown in FIG. 3 it is assumed that the Synchronous Digital Hierarchy (SDH) will be used as the transport layer of the ATM network being described. Thus in the embodiment being described the ATM cells generated at the ATM layer will be loaded into appropriate SDH frames before being transmitted over SDH networks to the destination switch. Conversely, upon receiving SDH frames by SDH termination points they are unloaded into ATM cells and delivered to the ATM switching functions. In FIG. 3 the termination points 26 and 27 of the two switches are shown as being divided into ATM termination points and SDH termination points to indicate this shared functionality.

There are two stages which are followed when a user sets up a connection or a call to another user. Firstly, using signalling, the user requests a connection from the network. The network switch to which the user is connected, in this case switch 1, using the call handling functions, VPM and CAC and by talking to other switches on the path to the destination, allocates a virtual circuit by giving it a VP and VC address and updating the routing tables in the switches. In FIG. 3 the dotted lines VP1 and VP2 show a virtual circuit set up between the two end points as represented by the users. As these are virtual paths it will be appreciated that the actual physical links along which the data will pass from one user to another need not be the direct one between switch 1 and switch 2.

Once a connection has been set up between the two end points as represented by the users individual ATM cells are sent from one user to another. As cells enter the switch they are processed for switching. The VP and VC address of a cell is picked up, and using the routing tables in the switch, the destination port for that cell and the new VP and VC addresses are determined. A new cell is created with the new VP and VC address and added to the output port.

Finally, when the user finishes the transmission of ATM cells, it asks the network to end the connection using the signalling messages. The switches thus delete the connection from their routing tables etc. and tear down the connection.

Effectively the SDH layer will be transparent to the ATM switching routines.

In the embodiment of the invention being described no attempt is made to provide a single algorithm or control function which is utilised by a central management structure to control bandwidth allocation to the virtual paths in order to match the allocated bandwidths to network conditions and to management policy. Accordingly the present embodiment utilises a distributed set of autonomous objects, which will hereafter be referred to as agents, in the programmable computers 7 located in the management system 6. Additionally in the present embodiment the agents have been kept very simple by having no state and no learning capability. One of the benefits of this simplicity is that the quantity and complexity of code required in the running of the system will be small. The complexity of behaviour required to manage a large network emerges from the interaction between the agents. In the present embodiment a set of agents which dynamically tune the VP network based on network performance measurements fall into three categories or sets. These three categories are diagrammatically represented in FIG. 4. The first category of agent is shown at 30 and will be referred to as VPC bundle agents which are responsible for a set of VPCs and their supporting VP links. The second type of agent is shown at 31 and is referred to as a link agent which is responsible for a physical link and the third type of agent is shown at 32 and is referred to as a coordinator agent which is responsible for coordinating actions taken in response to a network condition to prevent the other agents from performing conflicting actions.

The behaviour of each of these three agents will now be described with regard to FIGS. 5, 6 and 7.

The first of the agents to be described is the VPC bundle agent 30. The behaviour of this agent is described by the two rules shown in FIG. 5 of the accompanying drawings. The first rule shown in FIG. 5 is rule 1 and this rule fires at step 10 when new data arrives from the network. Essentially this rule detects if a problem is present and if this is the case requests the assistance of a coordinator agent 32. At step 11 the rule acts to find the VPC which is the most heavily utilised. At step 12 the rule checks if the utilisation level of the most heavily utilised VPC is over a predetermined threshold or not. If the answer is "Yes" a problem does exist and a request is sent at step 13 to the coordinator agent to find spare bandwidth. If the answer is "No" there is no problem and the rule ends with step 14.

Rule 2 of FIG. 5 fires if the VPC bundle agent 30 receives a request to change the bandwidth of a VPC. Such a request is received at Step 20, carried out at Step 21 and the rule ends with Step 22.

Figure 6A:
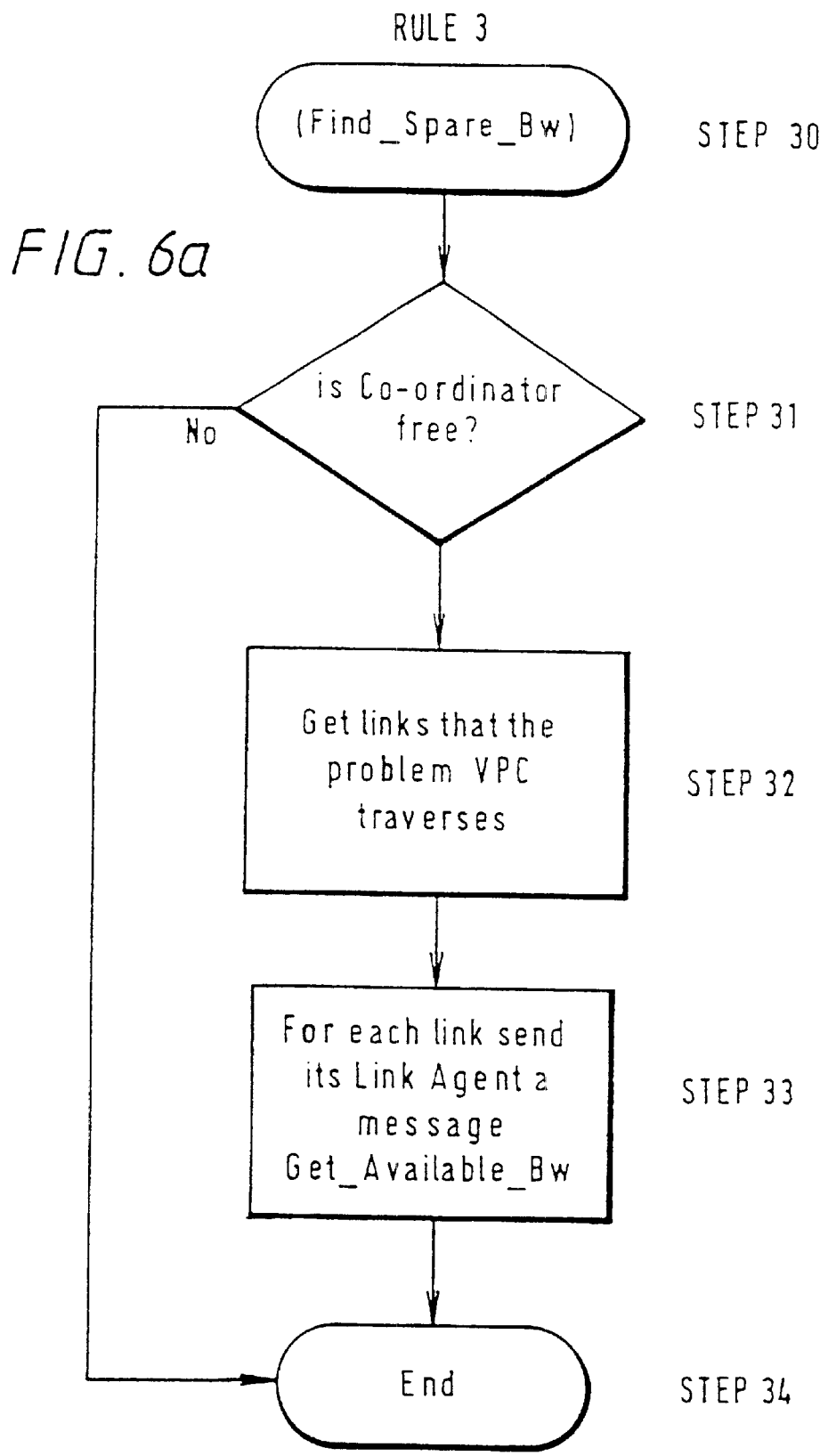
Figure 6B:
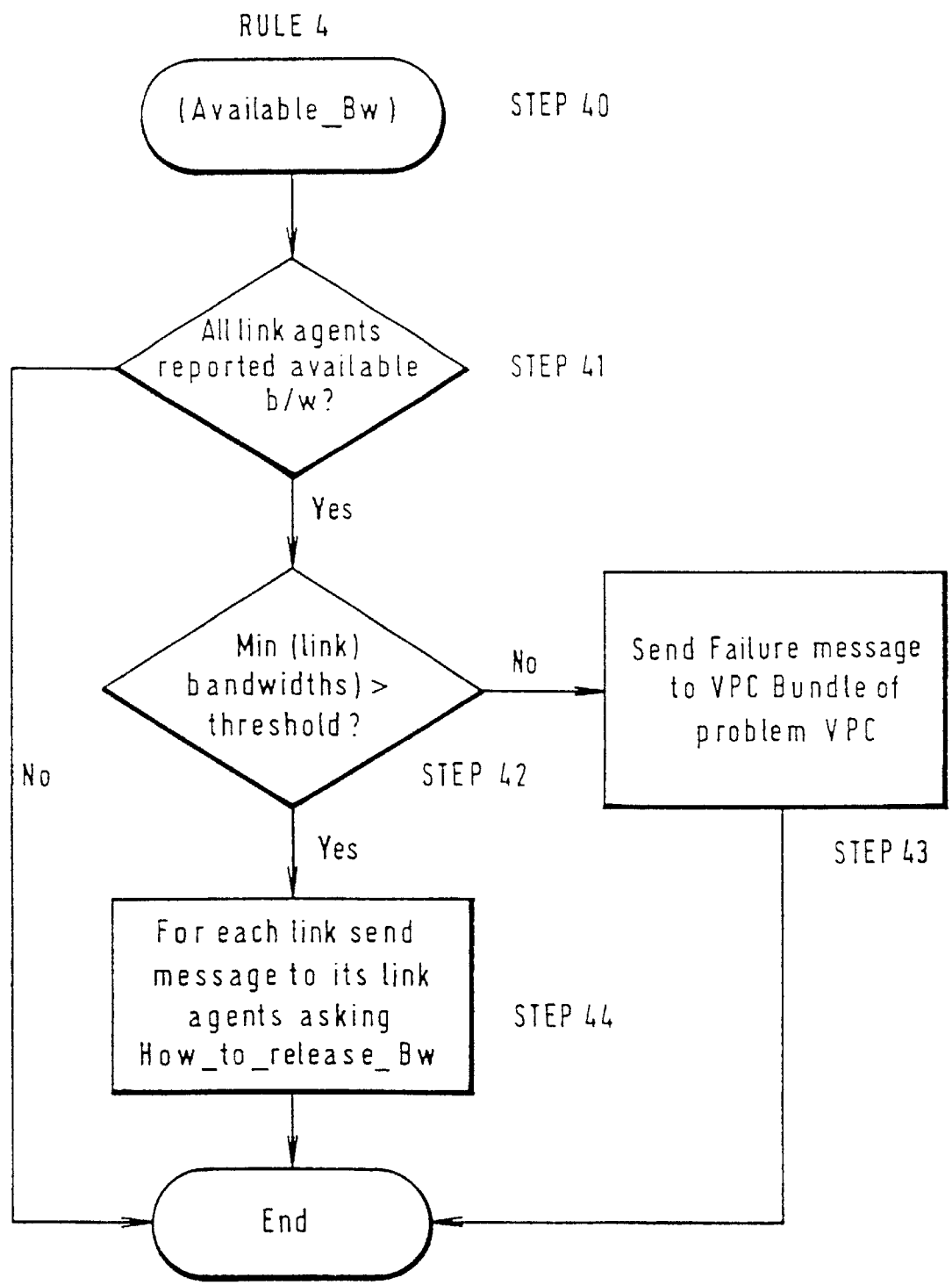
Figure 7B:
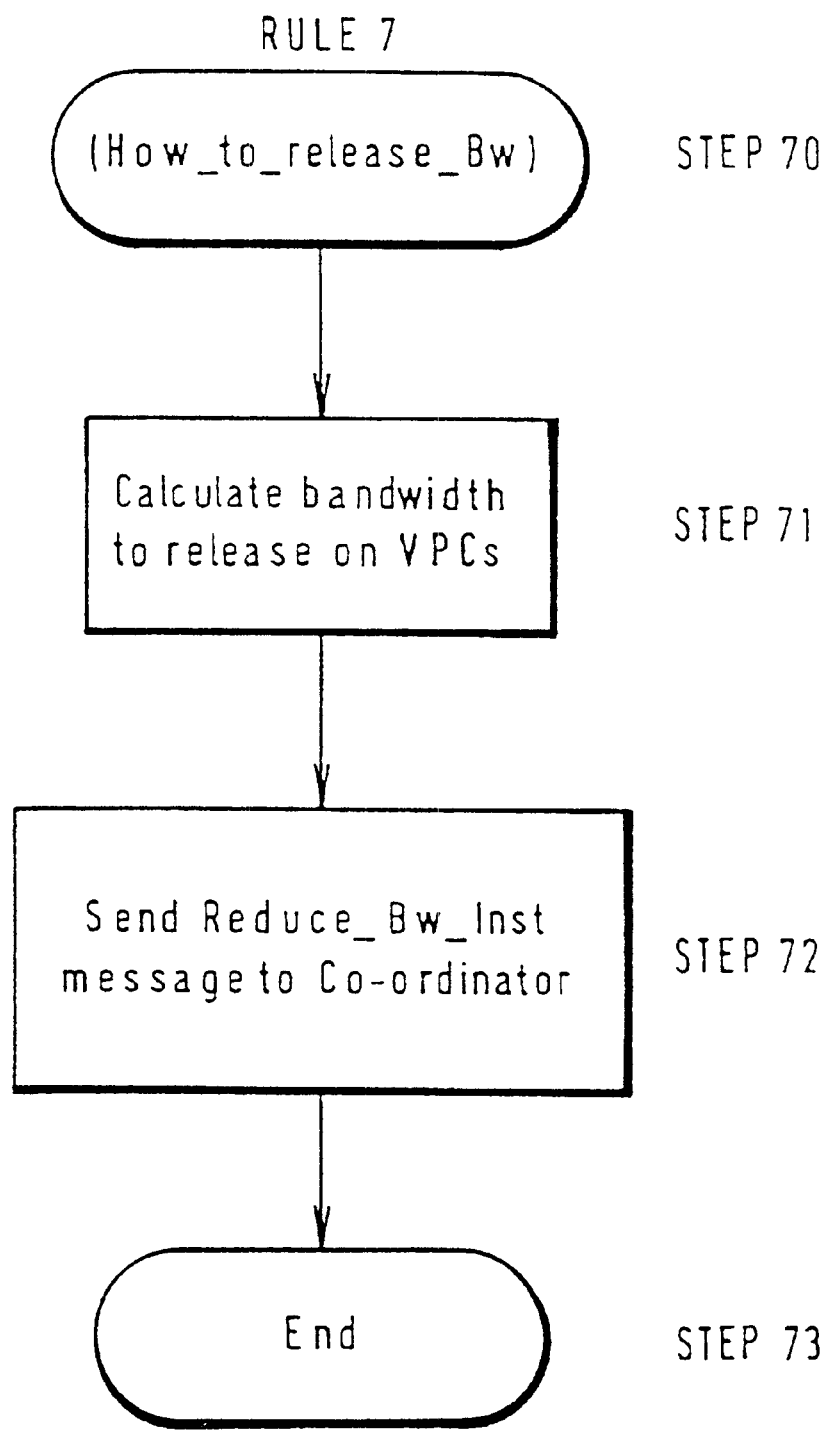

The behaviour of the coordinator agent 32 is described by the three rules 3, 4 and 5 shown in FIG. 6 of the accompanying drawings. The first rule in FIG. 6 is Rule 3 which fires at step 30 when new data is received from the network via a VPC bundle agent 30 in response to that agent having received a positive answer at step 12 of Rule 1 and having sent a request for spare bandwidth in accordance with step 13 of that rule. In response to the received request for more bandwidth, the coordinator agent determines at Step 31 whether or not it is free to assist. If it is free the coordinator agent obtains at Step 32 the links that the problem VPC traverses. Once the links have been obtained by Step 32 the coordinator agent queries the corresponding link agents to report to it any available bandwidth. This is done in Step 33. Rule 3 ends either with the decision at Step 31 that the coordinator is not free or with the request to the link agents in Step 33. The termination of the rule is shown at Step 34. The second rule associated with each coordinator agent is Rule 4 of FIG. 6 and this rule fires when the coordinator agent receives an event stating how much bandwidth is available on a particular link. Step 41 of Rule 4 is a decision as to whether or not all of the link agents have reported their available bandwidth. If all the agents do not report then the rule ends at Step 45. However, if all agents have reported the next step, Step 42, involves a decision by the coordinator agent as to whether or not the bandwidth reported by the links is sufficient to solve the problem. If the answer to Step 42 is "Yes" the coordinator agent asks the link agents for instructions as to how the bandwidth can be recovered. This is shown in Step 44. If the answer at Step 42 is "No", Step 43 sends a failure message to the VPC bundle agent of the problem VPC. In either case the rules end at Step 45. The third rule associated with the coordinator agent 32 is Rule 5 and this rule fires at Step 50 when the coordinator agent receives an event describing how to cover bandwidth on a link. Such an event is generated by the link agent in response to the message generated at Step 44 of Rule 4. When all the links of the VPC have responded Step 51 proceeds with the coordinator agent sending instructions to the links to perform the actions which had been reported at Step 51. This is shown at Steps 53 and 54. The rule ends at Step 52 if all the links do not respond. Once the links have been instructed in Steps 53 and 54 a success message (Step 55) is sent to the appropriate VPC bundle agent 30 and the rule ends at Step 56.

The last of the three agents is the link agent 31. The behaviour of this agent is described by the two rules 6 and 7 shown in FIG. 7.

Rule 6 fires at Step 60 when the link agent receives a request for available bandwidth sent by a coordinator agent in accordance with Step 33 of Rule 3. At Step 61 the link agent calculates the available bandwidth at Step 62 it compares the available bandwidth with a preset threshold. If the answer is that more bandwidth is available, the link agent sends at Step 63 a message to this effect to the coordinator. This corresponds to the link agent fulfilling the requirement for Step 51 of Rule 5. If no more bandwidth is available the rule sends that message at Step 64 to the coordinator. The rule ends at Step 65.

The second rule covering the behaviour of a link agent 31 is Rule 7. This rule fires at Step 70 when the link agent receives a request to free up an amount of bandwidth, this request corresponding to Steps 53 and 54 of Rule 5. At Step 71 the link agent calculates the bandwidth to be released and at Step 72 sends to the appropriate coordinator agent 32 an instruction concerning the amount of bandwidth to be released. Rule 7 ends at Step 73.

Figure 8:
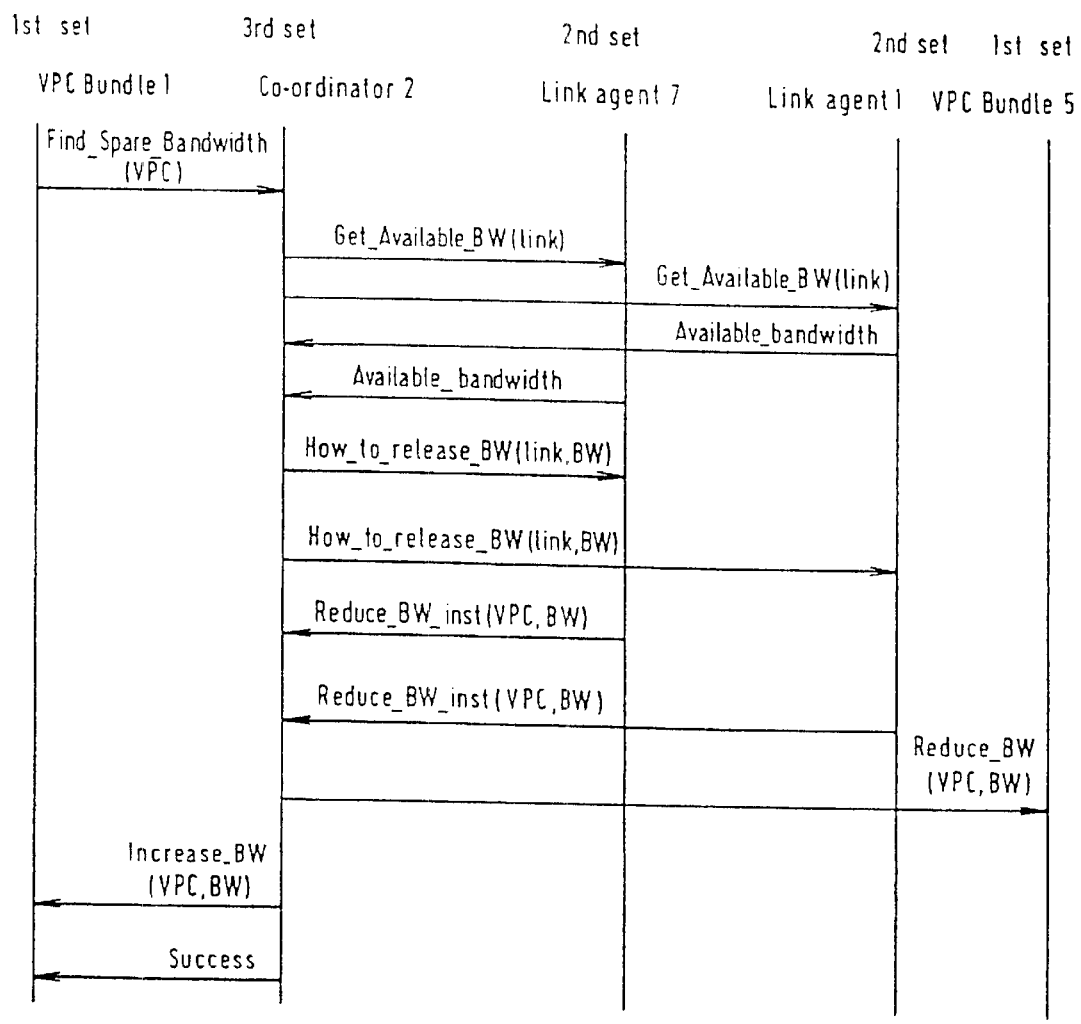
FIG. 8 shows a sequence of messages used in tuning the bandwidth of a virtual path.
Figure 9:
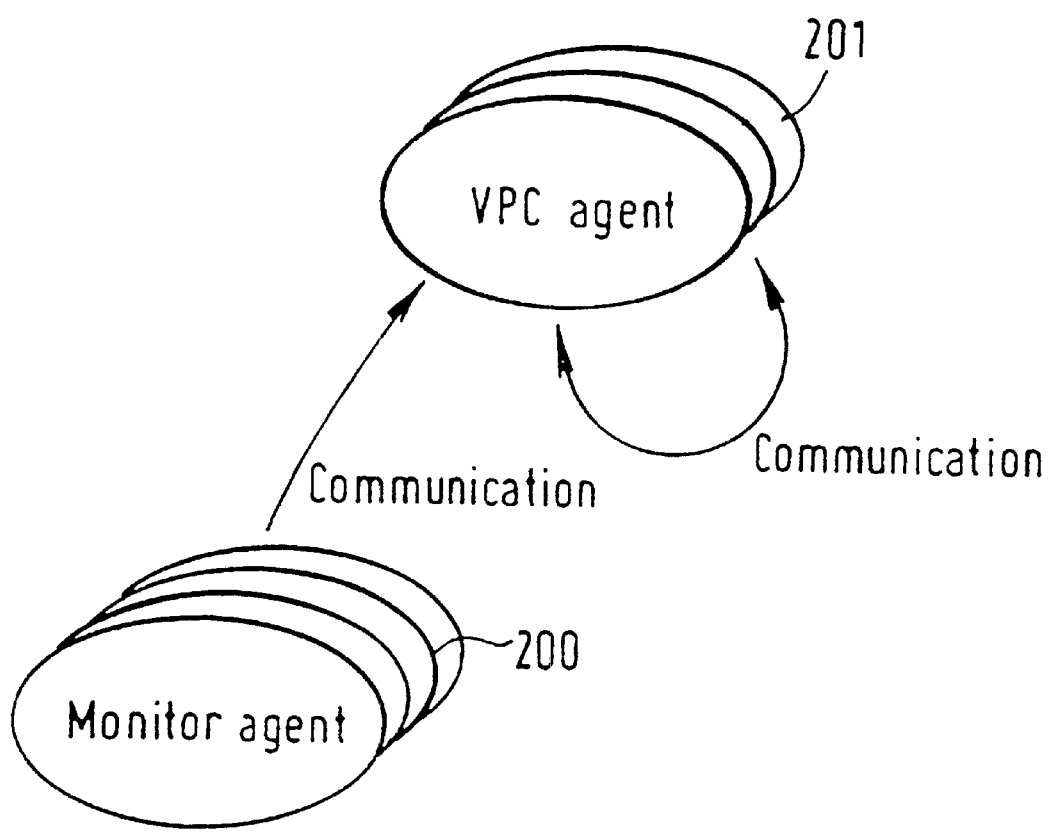
FIG. 9 is a diagrammatic representation of two intelligent agent types which comprise a second embodiment of the present invention.

FIG. 8 of the accompanying drawings is a diagram showing the temporal sequence and paths between the agents of messages sent during the tuning of bandwidths for a VPC.

There are ten basic messages which are used to carry out this tuning. These messages are:
(1) Find_Spare_Bandwidth($VPC_{problem}$)—a request to the coordinator to find the spare bandwidth for $VPC_{problem}$
(2) Get_Available_BW(link)—get the available bandwidth on link.
(3) Available_bandwidth(b/w)—returns the bandwidth available on a link.
(4) How_to_release BW(link,$BW_{min}$)—get instructions on how to release bandwidth, $BW_{min}$, on link.
(5) Reduce_BW_inst(link,BW,instructions)—instructions on how to reduce the bandwidth by BW on link.
(6) Reduce_BW(VPC,BW)—instruct VPC bundle to reduce the bandwidth on VPC by BW.
(7) Increase_BW($VPC_{problem}$,BW)—instruct VPC bundle to increase the bandwidth of $VPC_{problem}$ by BW.
(8) no_available_bandwidth—sent by link agent to inform coordinator that no bandwidth is available.
(9) Success—inform VPC bundle agent of successful resolution of problem.
(10) failure—inform VPC bundle agent of failure to resolve problem.

As will be appreciated from the foregoing the individual agents have no state and no learning capability.

In the management system which has just been described scaleability is achieved by adding agents as appropriate. Thus as a physical link is added to the network a link agent responsible for that link is added either to one of the computers in the management system or by the addition of a further computer. Similarly as the size of the network increases VPC bundle and coordinator agents can be added as appropriate using either computers already forming part of the management system or by adding further computers. It will also be appreciated that the computers may be either partly or totally replaced by purpose-built integrated circuits. This would of course cause a reduction in flexibility.

The ability to scale in this manner is based on the simple rule-based nature of the three sets of agents.

As already mentioned in the preamble of this specification, the system just described cannot deal with what has been defined as a VP Topology problem. A management system which is capable of working in parallel with the system of FIGS. 1 to 8 to solve VP Topology problems will now be described with reference to FIGS. 9 to 15.

As in the system of FIGS. 1 to 8 the VP Topology Problem Management System employs distributed agents. Also the physical connection and switches of the system are similar to those described with reference to FIGS. 2 and 3 so that the VP Topology Problem Management System resides in the plurality of programmable computers 7 shown in FIG. 2. The VP Topology Problem Management System, as with the previously described system for controlling bandwidth allocation, utilises a distributed set of autonomous agents in the programmable computers 7. As in the previous embodiment the agents have been kept very simple by having no state and no learning capacity. In the present embodiment it utilises two agent types 200, 201 illustrated in FIG. 9 of the accompanying drawings. The agent type indicated at 200 will hereinafter be referred to as a monitor agent and the agent type 201 will hereinafter be referred to as a VP agent.

The number of monitor agents will be in this embodiment the same as the number of links in the network and each monitor agent 200 is responsible for identifying a VP Topology problem and then notifying appropriate VP agents 201 to deal with the identified problem. Thus each monitor agent monitors its link and the VPs that use the link for the conditions that indicate a problem.

Figure 10:
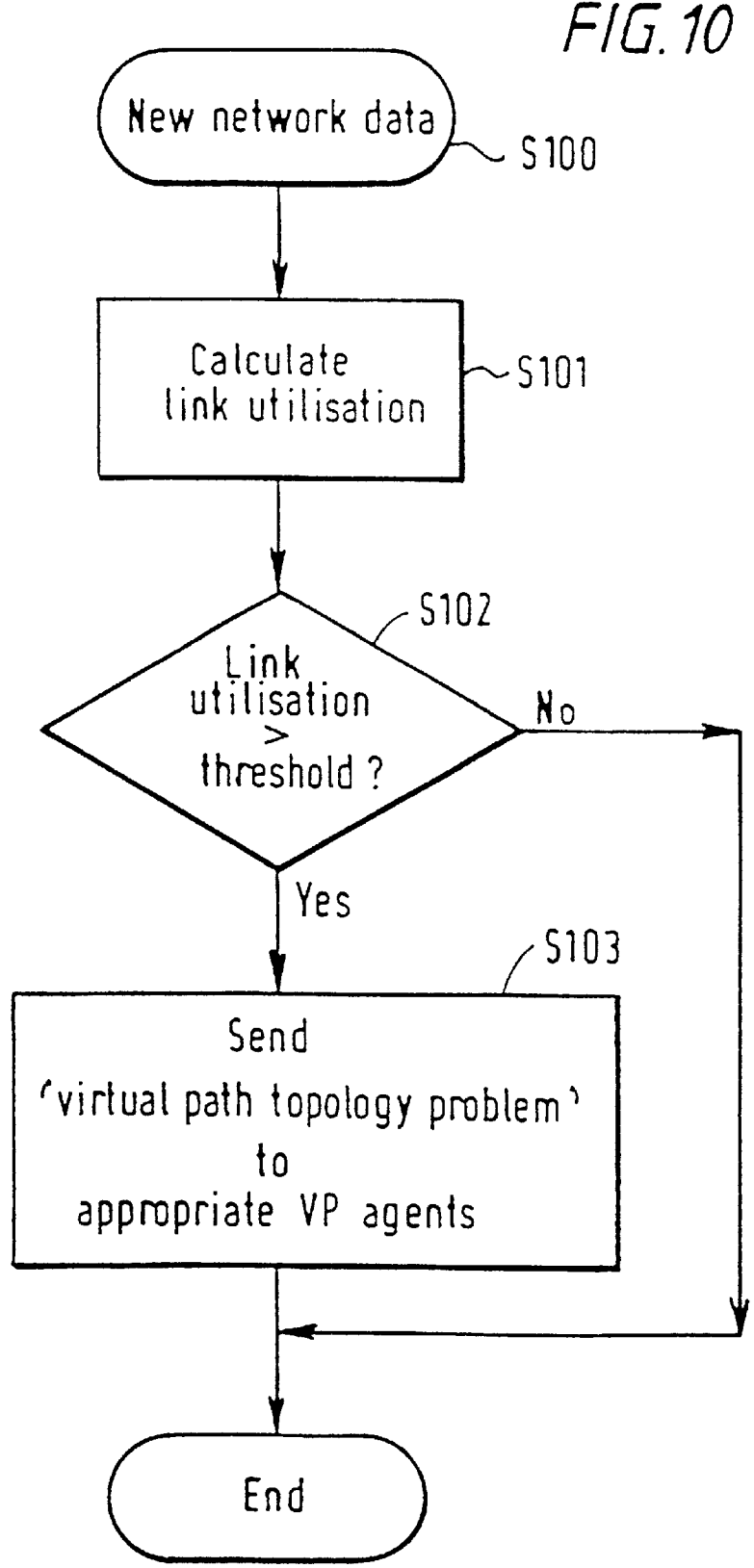
FIG. 10 is a flow diagram of a rule which controls the behaviour of one of the agents of FIG. 9.

The behaviour of a monitor agent 100 is described by the rule shown in FIG. 10.

Referring now to FIG. 10, the rule governing the behaviour of a monitor agent 200 will be referred to as Rule 8 and fires at Step S100 when new data arrives from the link being monitored by the agent. At Step S101 the rule acts to calculate the utilisation levels of the link. This is done by calculating the sum of the bandwidth allocated to the VPs using the link. If this sum is equal to, or exceeds a predetermined threshold, then a VP Topology problem is identified. This is shown at Step S102. The actual process carried out by the monitor agent 201 at step S101 is as follows.

Call Acceptance Control (CAC) as shown at 24 in FIG. 3 is responsible for accepting or rejecting a new connections onto the network depending on the capacity left in the network. Each connection type has an associated 'effective bandwidth' which is the amount of bandwidth the CAC allows for an actual connection of that type. When a new connection requests use of a VP, CAC subtracts the sum of the effective bandwidth's for active calls on the VP from the bandwidth that has been reserved for it on the links it traverses. Each VPC has a 'load factor' which says that the CAC should only accept calls up to a certain utilisation. If there is enough spare effective bandwidth, after taking any load factor into account, the connection is accepted.

As already described, each VP may carry a number of different connection types, with different effective bandwidths. The monitor agent threshold is set by calculating the effective bandwidth for each VP carried by a link above which the next connection request may be rejected. These bandwidths are summed to find the maximum effective bandwidth that could be allocated. A management policy will then decide a point below this to set as the threshold to trigger a Topology problem.

EXAMPLE

Link Capacity 155 Mbs
  Carries two VPCs;

| VPC1 | reserved bandwidth | 100 Mbs |
| | load factor | 0.9 |
| | connection types | conn1 conn2 |
| VPC2 | reserved bandwidth | 55 Mbs |
| | load factor | 0.8 |
| | connection types | conn3 |

Conn1 effective bandwidths 5 Mbs
Conn2 effective bandwidths 7 Mbs
Conn3 effective bandwidth 3 Mbs
Max effective bandwidth for VPC1
  100*0.9=90 Mbs available for connections
For simplicity the largest effective bandwidth which is 7 Mbs is chosen
  90/7=12.9, so 12 connections can be accepted.
The maximum effective bandwidth for VPC1 before the next request may be rejected (if Conn2) is
  12*7=84 Mbs
Similarly, for VPC2 the maximum effective bandwidth before the next request may be rejected is
  42 Mbs
The maximum effective bandwidth for the link is 42+84= 126 Mbs.

In the present embodiment management policy decides to trigger Topology Management when total effective bandwidth reaches 90% of this figure. So the actual threshold in this example is 126*0.9=113 Mbs. Thus the threshold is based on the sum of the maximum bandwidths that may be allocated to the connections for each VP.

If a problem is present the monitor agent notifies at Step S103 each of the VP agents 201 which are associated with a VP which uses the problem link and the other VP agents concerned with the problem. As mentioned previously in the present specification each network resource is represented by a distributed object. Each object representing a link has a reference to the objects representing the VP's that it carries. In turn each of these objects has a reference to the VP agents that have an interest in them. Each VP agent 201 represents a VP for a particular Quality of Service (QoS). When it is informed of a VP Topology problem it works with any other VP agents that have been notified of this problem to try and make capacity available on the problem link.

Figure 11:
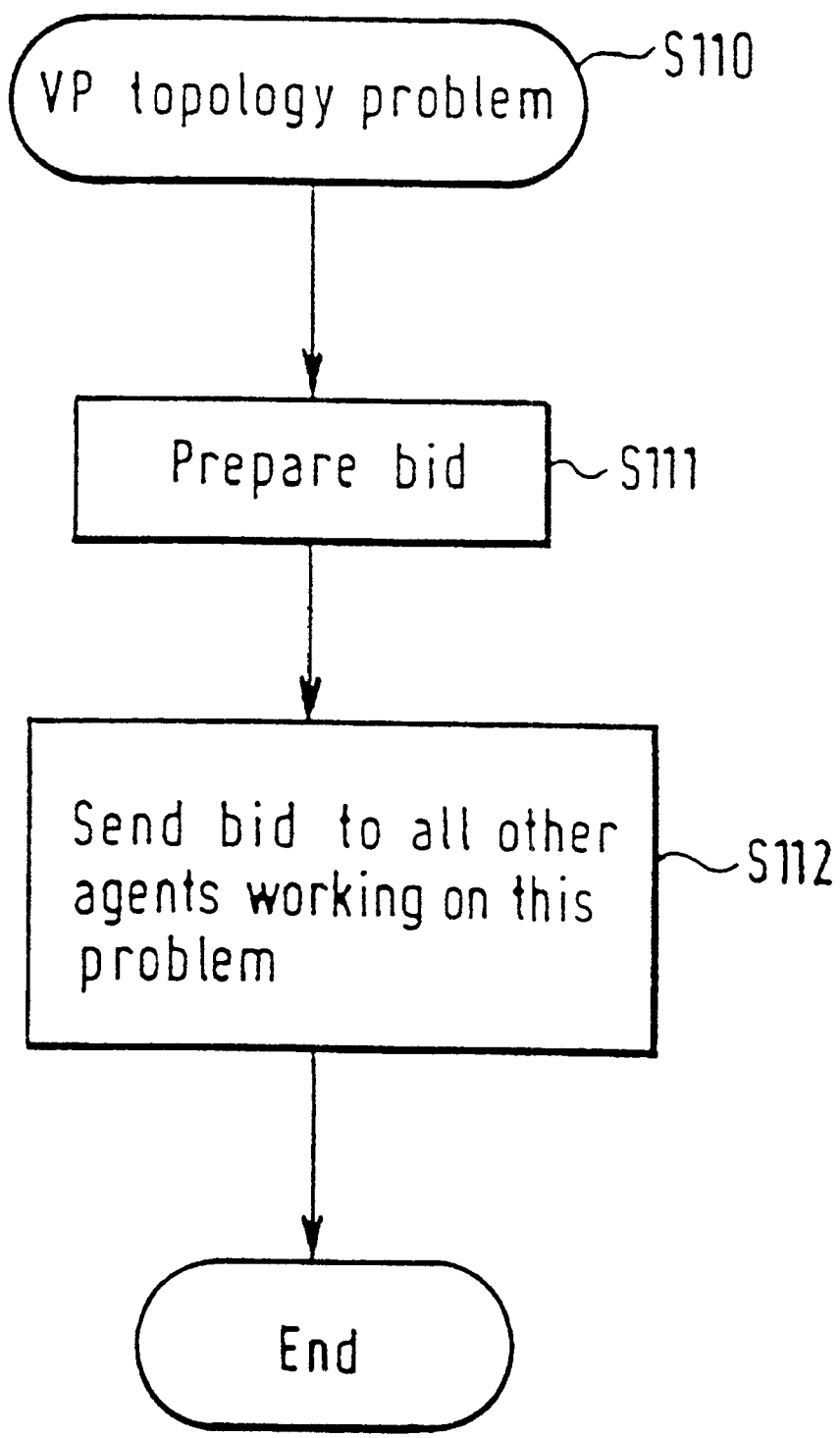
FIGS. 11 and 12 are flow diagrams of two rules which control the behaviour of the second of the agents of FIG. 9.
Figure 12:
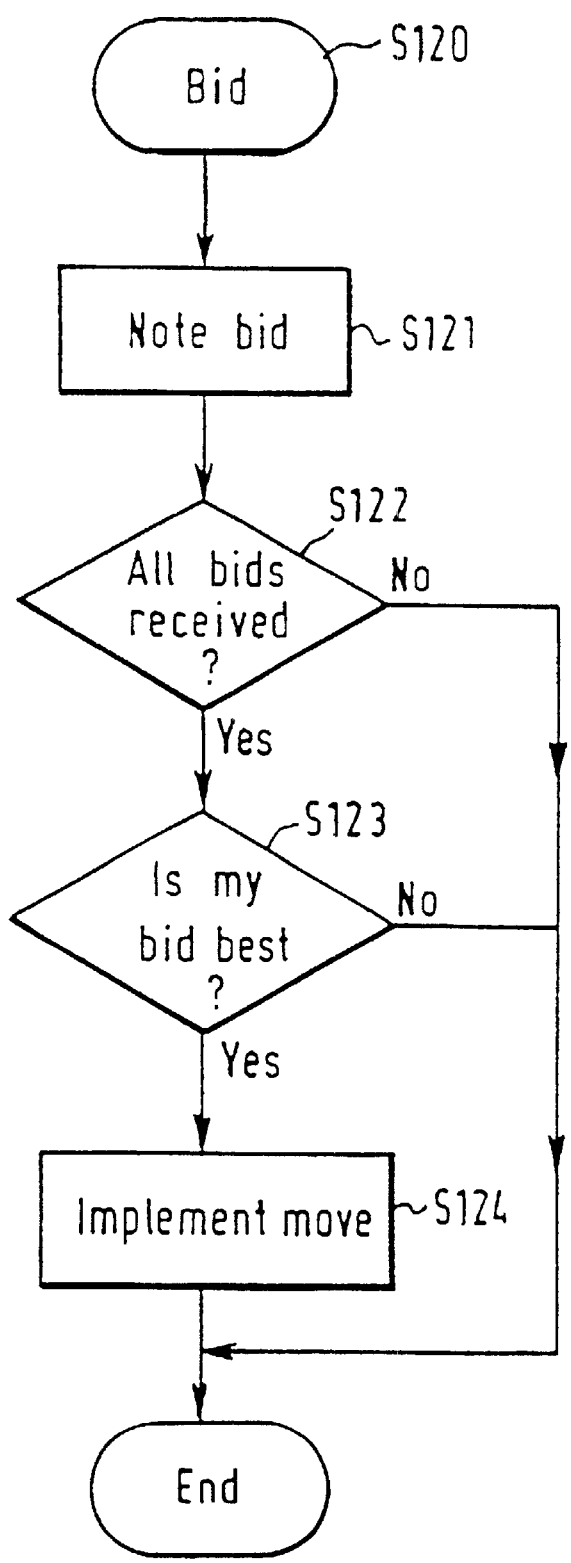

The behaviour of each VP agent 201 is described by the rules illustrated in FIGS. 11 and 12. Thus FIG. 11 illustrates a Rule 9 which is triggered when a VP agent 201 receives a VP Topology problem message in response to a signal from a monitor agent 200 sent in response to a "YES" output at Step 203 in previously described Rule 8. Thus Rule 8 is triggered at Step S110 when the VP agent 201 receives a notification that a VP Topology problem is present. At Step S111 Rule 8 carries out a series of functions which can be categorised as "preparing a bid". The agent prepares the bid by searching for a new route through the network that avoids the problem link and has appropriate spare capacity in all the links it will traverse. The bid is a numerical score based on the bandwidth that will be moved and the amount of spare capacity along the new route. If no route can be found a score guaranteed never to win will be produced. At Step S112 the VP agent sends its bid to all the other VP agents which were notified by the monitor agent 200 that a VP Topology problem existed.

FIG. 12 illustrates Rule 10. This rule is triggered at Step S120 when a bid is received from another agent. At Step S121 the bid is recorded along with any other bid which has been generated by any other VP agent involved in the problem and which had been notified by the monitor agent 200 of the problem. When all bids have been received and recorded the VP agent can determine if its bid is best. This is illustrated at Step S122. If all the bids have been received the rule proceeds to Step S123 where the agent determines if its bid is the best. If its bid is not the best it again takes no further action. If the VP agents own bid is the best it then implements a set of actions to create a bypass for the link which caused the initial problem.

This is done at Step S124 and comprises the steps of:
a) Creating a set of virtual links to support the new virtual path connection.
b) Creating the new virtual path connection over the virtual path links.
c) Modifying routing tables 21 which form part of the ATM switch described with reference to FIG. 3 of the drawings.
d) Watching for all existing connections on the old VPC to complete.
e) Removing the old VPC.

Figure 13A:
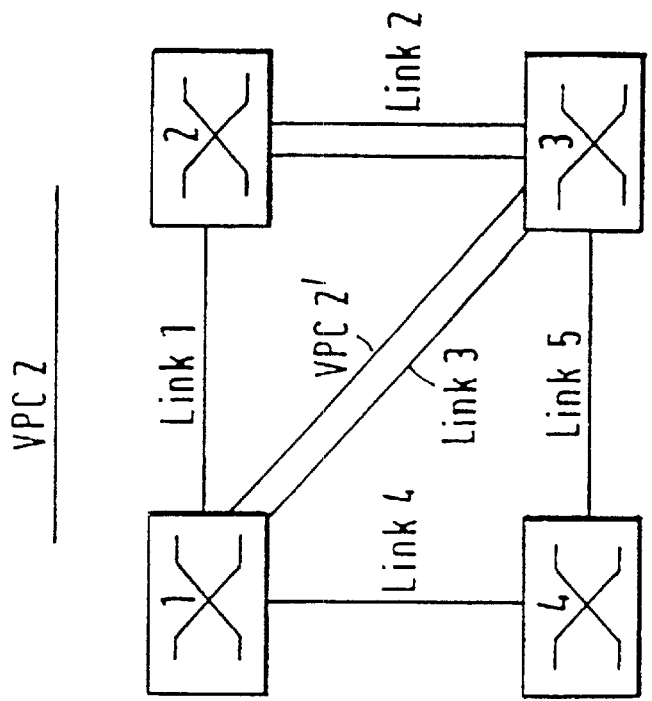
FIGS. 13a and 13b are network diagrams illustrating the operation of the agents of FIG. 9.
Figure 13B:
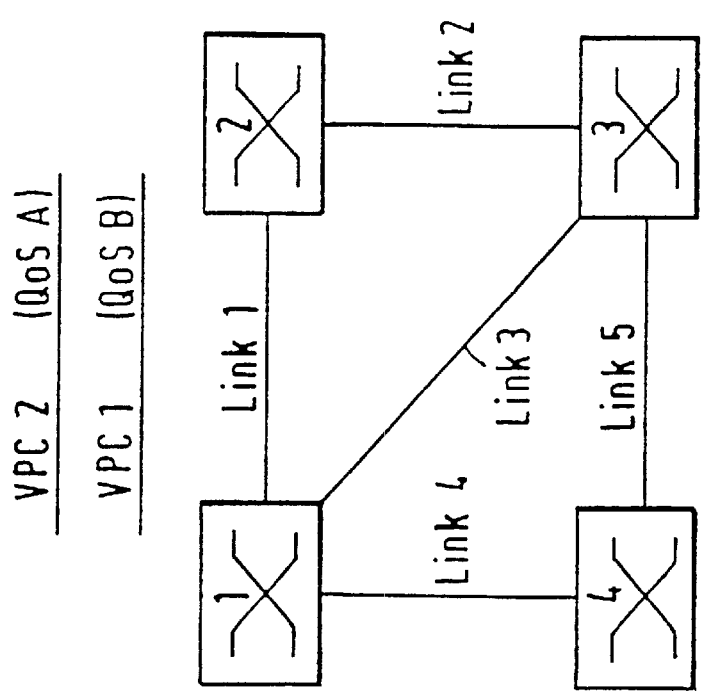

The results of these operations are illustrated in FIGS. 13A and 13B in which FIG. 13A shows a network configuration when a VP Topology problem has arisen and FIG. 13B shows the results of the activity of the already described Monitor and VP agents. The network shown in FIGS. 13A and 13B is similar to that shown in FIG. 2. It will be seen that the links which had been generally indicated at 5 in FIG. 2 are now individually numbered 5(1), 5(2), 5(3), 5(4) and 5(5).

As shown in FIG. 13A link 5(1) consists of 2 VPCS, VPC1 and VPC2.

In FIG. 13A the following conditions exist in the network when data is first read:
VPC1 is using all its reserved bandwidth.
VPC2 requires more than its allocated bandwidth.
LINK 1 has had all its capacity allocated to VPC1 and VPC2.
LINK 2 and LINK 3 have spare capacity.

It is assumed in this figure that there is one VPC Bundle agent 30 t hat ha ndles all the VPCs for Bandwidth Tuning. The Bandwidth management system tries to increase the bandwidth of VPC2 but fails because there is no spare capacity. The Topology management system identifies the problem and replaces VPC1 with VPC1' that uses LINK 3 and LINK 2 as has been already described with regard to FIGS. 13a 13b and 14.

FIG. 14 shows the temporal sequence of messages between the monitor agent (200) which monitors link 5(1) of FIG. 13A and the two VP agents (201) responsible for VPC1 and VPC2 respectively.

In the diagram of FIG. 14 the relationship between the Rules 8, 9 and 10 and the monitor and VP agents is shown by using the step numbers together with the number of the relevant rule as combined numbers. As with FIG. 8 the passage of time is indicated in the downwards direction.

Thus the first action in FIG. 14 is the monitor agent reading data from the link 5(1) in accordance with Step S100 of Rule 8. Next in accordance with Step S101 of Rule 8 the existence of a VP Topology problem is notified to the respective VP agents representing VPC1 and VPC2 respectively. In practice these two notifications would be virtually simultaneous. On receipt of the notification of a problem the two VP agents carry out the steps of Rule 9 and in particular send out respective bids at S112(9) to each other. In the illustration of FIG. 14 the bid of the VP agent for VPC1 wins and as a result the winning bid is implemented at S124(10).

Figure 4:
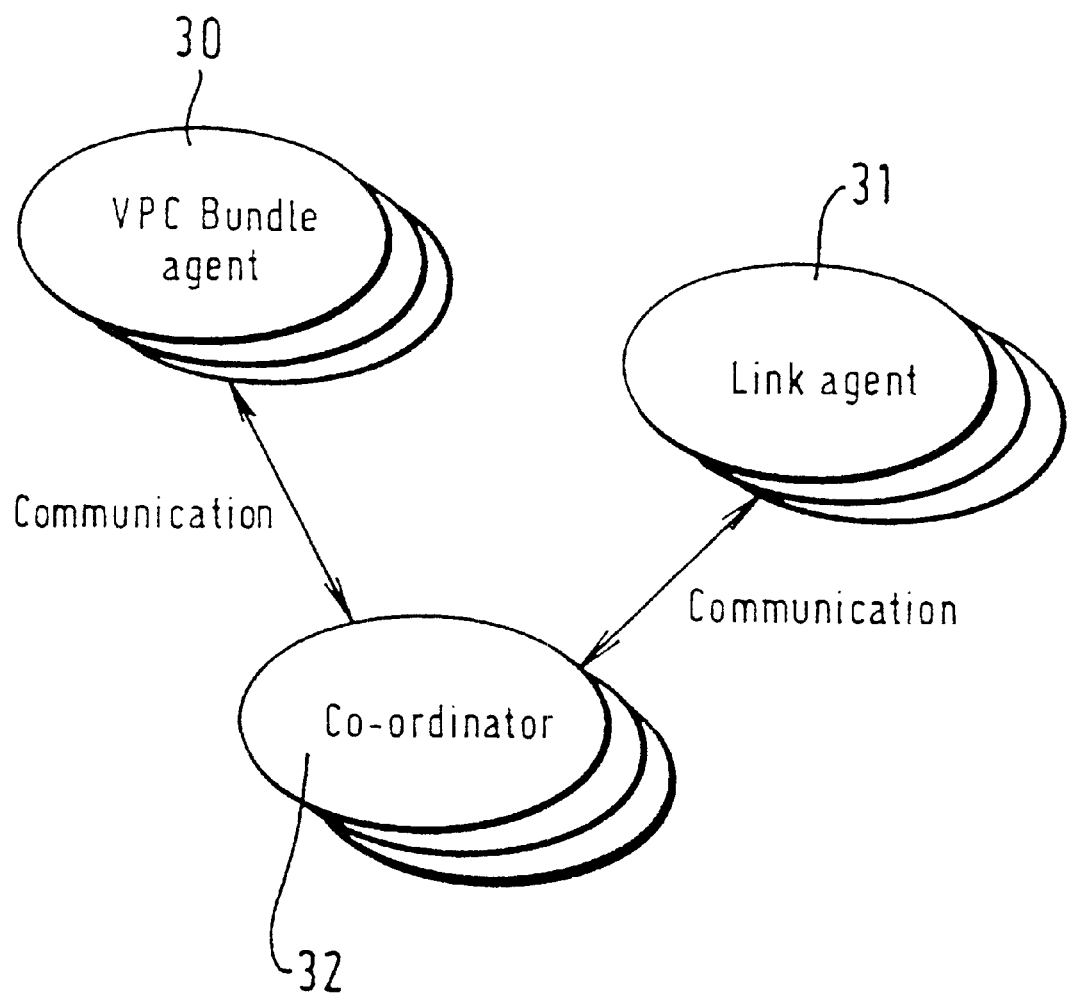
FIG. 4 is a diagrammatic representation of three intelligent agent types which comprise a first embodiment of the present invention.

The result of the implementation is shown in FIG. 13B. VPC1 has been deleted and replaced by VPC1' the physical path of which passes via ATM switch 3 but as was explained with regard to VPC 56 of FIG. 2 cannot terminate at switch 3. Once the new VPC (VPC1') has been created (as shown in 13B) data about it will start to arrive from the network. Similarly when the old VPC (VPC1) has been deleted data about it will no longer arrive from the network. It will be apparent that the Topology Management System just described is capable of operating independently of the bandwidth management system described with respect to FIGS. 1 to 8 and that the converse is also applicable. However it is preferred for the two systems to operate in parallel. In this embodiment the agents described will all reside in the general purpose computers 7 of FIG. 2. It is thus essential that the agents shown in FIG. 4 are capable of taking the changes caused by the Topology Management System into account.

The division of the Topology Management system into monitor and VP agents makes the system more robust since the failure of a VP agent will only means that it is not involved in problem solution. VP agent failure is detected by having a time period in which all bids must be received. If VP agent's bid is not received in this time period then it is excluded from the problem but the problem can still be solved by the other VP agents. If there were a controller agents that received these bids to make the decision and this controller agent failed then the problem could not be solved.

Thus whilst the Topology Management system could incorporate central controller but the more distributed control mechanism just described provides greater security in generation for the reasons just given.

Figure 15:
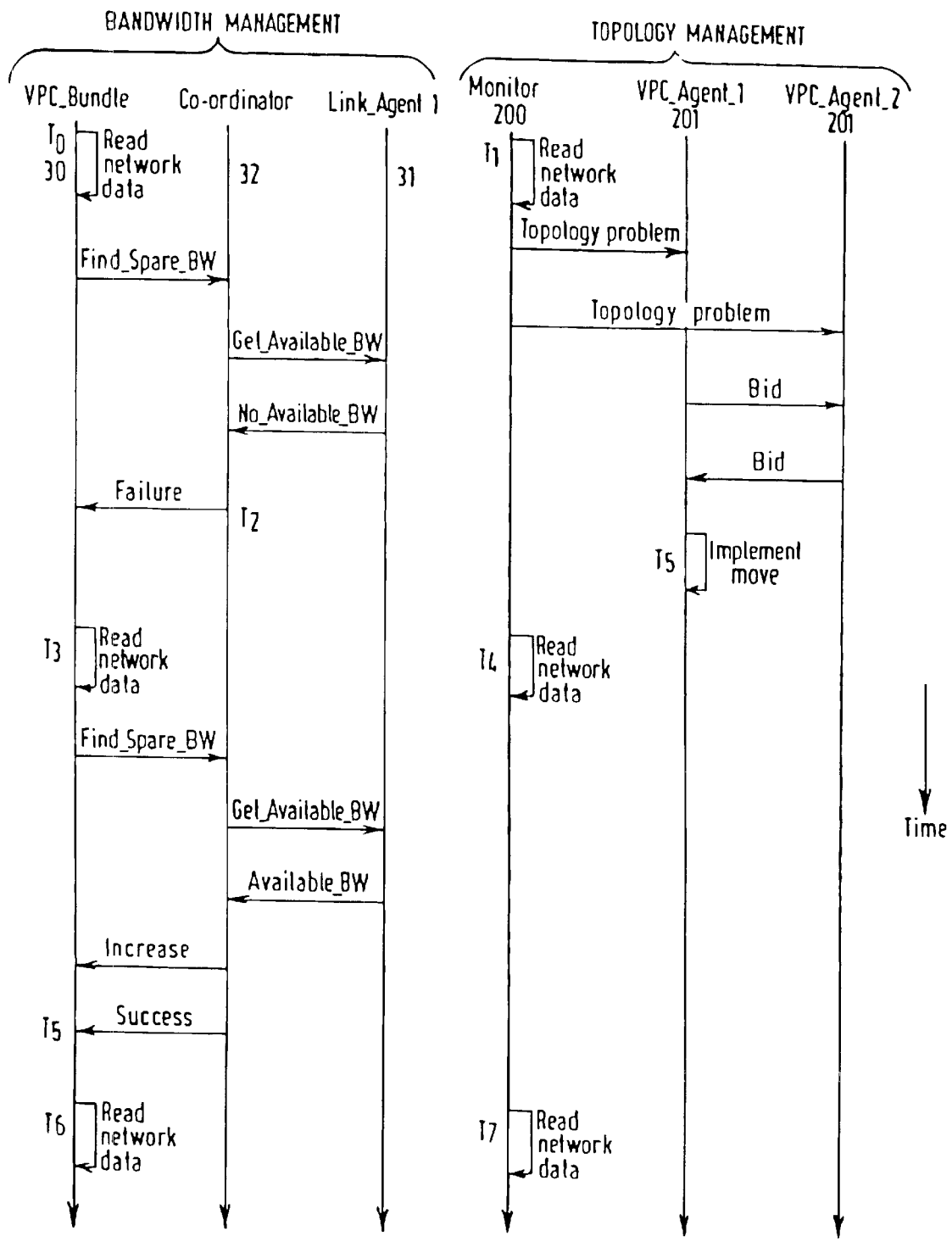
FIG. 15 is a sequence of messages in a third embodiment in which bandwidth management and Topology Management operate in parallel.

FIG. 15 of the accompanying drawings is an illustration of the parallel working of the bandwidth of Topology Management Systems and is effectively a combination of FIG. 8 and of FIG. 14 with the bandwidth management system slightly simplified in that only a single link agent 31 is shown.

In the temporal sequence the bandwidth management system reads the network data at $T_0$ and the Topology Management System reads the network data at $T_1$. Bandwidth management fails at $T_2$; Topology Management alters the network at $T_3$ by replacing VPC1 by VPC1'; Bandwidth management reads the new network data at $T_4$ with successful tuning indicated at $T_5$. Further readings by both management sub-systems at $T_6$ and $T_7$ indicate no further problems.

It will also be apparent that the two management systems can operate over different timescales and that there is no need for there to be a specific integration of these timescales. Thus the two systems can operate entirely independently provided that changes in the network configuration are recognised by the two systems.

What is claimed is:
1. A management system for an ATM virtual path network having a plurality of physical connections in which said physical connections are provided by broadband links between ATM switches, and comprising electronic data processing means connectable to individual ATM switches in said ATM virtual path network and for determining current network load in individual broadband links and virtual paths of the network, said electronic data processing means providing first, second and third sets of intercommunicating distributed agents for carrying out management of the ATM switches in the system in response to measured load and management requirements, wherein each agent of said first set is associated with the virtual paths and is adapted to respond to a lack of bandwidth in one of its associated virtual paths to generate a request to an agent of said third set to obtain bandwidth.

2. The management system according to claim 1, wherein each one of said third set of agents is adapted in response to a request from an agent of said first set to request information regarding the availability of bandwidth on one or more physical links from agents of said second set associated with the physical links, each agent of said second set responding to a request from an agent of said third set by sending to said agent of said third set information defining the availability of bandwidth on its associated link.

3. The management system according to claim 2, wherein in response to bandwidth information received from each agent of said second set said agent of said third set is adapted to instruct each agent of the second set how bandwidth is to be released.

4. The management system according to claim 3, wherein each of said second set agents so instructed by an agent of said third set is adapted to calculate a bandwidth to be released in response to the request and to send to the agent of said third set of distributed agents an instruction concerning the bandwidth to be released.

5. The management system according to claim 4, wherein in response to the instructions received from each agent of said second set the agent of said third set is adapted to instruct an agent of said first set of agents which made said request to increase bandwidth to meet its requirements and instructs the agent of said first set of agents associated with the second set of agents which carried out bandwidth calculations.

6. The management system according to claim 1 and adapted to carry out VP topology management of the ATM virtual path network, and wherein the distributed agents comprise means for monitoring the links of the ATM network, means for determining if a bandwidth problem exists over one of the broadband links, means for notifying a plurality of means associated with virtual paths in the network and each adapted to identify a new route through the network that both avoids the one of the broadband links having a bandwidth problem and has spare capacity, and means for selecting the new route identified and creating a new set of virtual path connections over a broadband link or a number of broadband links of the network.

7. The management system according to claim 6, wherein said monitoring means are adapted to calculate the source of bandwidth allocated to virtual path connections which constitute the broadband link, to compare the allocated bandwidth with a predetermined threshold, and to notify the means associated with the virtual paths of the broadband link if a problem exists.

8. The management system according to claim 7, wherein said monitoring means comprise a plurality of distributed monitoring agents, there being a monitoring agent for each link.

9. The management system according to claim 8, wherein the means associated with the virtual paths comprise for each virtual path a distributed virtual path agent.

10. The management system according to claim 9, wherein each virtual path agent is adapted to generate on receipt of notification of the problem by the monitoring agent a bid based on bandwidths to be moved and the amount of spare capacity along the new route after a virtual path agent has identified a route, a virtual path agent selecting the route in response to a best bid generated.

11. The management system according to claim 10, wherein each virtual path agent is adapted to send a bid to each virtual path agent notified by the monitor agent, and the means for selecting the route in the virtual path agent which generates the best bid.

12. The ATM network management system as in claim 1 further comprising a bandwidth management system, wherein the first, second and third sets of inter-communicating distributed agents comprise a first set of agents for the virtual paths of the network, a second set of agents responsible for said physical links, and a third set of agents for handling performance events and adapted to carry out VP topology management of the ATM virtual path network, and wherein the distributed agents comprise means for monitoring the links of the ATM network, means for determining if a bandwidth problem exists over a link, means for notifying a plurality of means associated with said virtual paths in the network and each adapted to identify a new route through the network that both avoids the link having the bandwidth problem and has spare capacity, and means for selecting the route identified and creating a new set of virtual path connections over a broadband link or a number of broadband links of the network.

13. A method of managing an ATM virtual path network having a plurality of physical connections in which said physical connections are provided by broadband links between ATM switches, and comprising electronic data processing means connectable to individual ATM switches in said ATM virtual path network and for determining current network load in individual links and virtual paths of the network, said electronic processing means providing three sets of inter-communicating distributed agents for carrying out management of the ATM switches in the virtual path network in responses to measured load and management requirements, the agents comprising a first set of distributed agents for the virtual paths of the network, a second set of distributed agents responsible for physical links, and a third set of distributed agents for handling performance events, and wherein said each agent of said first set of distributed agents is associated with a plurality of virtual paths and responds to a lack of bandwidth in one of its associated virtual paths to generate a request to an agent of said third set of distributed agents to obtain bandwidth.

14. The method according to claim 13, wherein each one of the third set of distributed agents responds to a request from a first set agent to request information regarding the availability of bandwidth on one or more physical links from the agents of said second set of distributed agents associated with the physical links, each of said second set of distributed agents responding to a request from an agent of said third set of distributed agents by sending to the agent of said third set information defining the available bandwidth.

15. The method according to claim 14, wherein in response to bandwidth information received from each of said agents of said second set of distributed agents, an agent of said third set of distributed agents instructs each of the agents of said second set of distributed agents how bandwidth is to be released.

16. The method according to claim 15, wherein each agent of said second set of distributed agents so instructed by an agent of said third set of distributed agents calculates the bandwidth to be released in response to the request and sends to the third set agent an instruction concerning the amount of bandwidth to be released.

17. The method according to claim 16, wherein in response to the instructions received from each agent of said second set the agent of said third set instructs the agent of said first set which made said request to increase bandwidth to meet its requirements and instructs the agent of said first set associated with the agent of said second set which carried out bandwidth calculations to reduce bandwidth.

18. A method of managing an ATM virtual path network in which the physical connections are provided by broadband links between ATM switches, and comprising measuring current network load in individual links and virtual paths, and utilizing sets of inter-communicating distributed agents for carrying out management of the network in response to measured load and management requires, comprising monitoring the links of the ATM network and determining if a bandwidth problem exists over a link, notifying a plurality of virtual path agents associated with virtual paths in the network said virtual paths agents each identifying new routes through the network that both avoid the link having the bandwidth problem and have spare capacity, and creating a new set of virtual path connections over a broadband link or a number of broadband links of the network.

19. The method according to claim 18, wherein said monitoring is carried out by a plurality of distributed monitor agents each adapted to calculate a sum of bandwidth allocated to an actual virtual path which constitutes the broadband link, to compare the sum with a predetermined threshold, and to notify agents of the virtual path if a problem exists.

20. The method according to claim 19, wherein said monitoring is performed by a plurality of distributed monitoring agents, there being a monitoring agent for each link.

21. The method according to claim 20, wherein each virtual path agent on receipt of notification of the problem by the monitoring agent generates a bid based on a bandwidth to be moved and the amount of spare capacity along a new route after the agent of the actual virtual path has identified a route; the virtual path agent selecting a best route doing so in response to bids so generated.

22. A topology management system for an ATM virtual path network having a plurality of physical connections in which the physical connections are provided by broadband links between ATM switches, and comprising electronic data processing means connectable to individual ATM switches in said ATM network, and providing sets of inter-communicating distributed agents for carrying out management of the ATM switches in the system in response to measured load and management requirements, and wherein said sets of inter-communicating distributed agents comprise a first set of monitor agents, each agent being associated with an individual link and being adapted:

a) to monitor bandwidth of its associated link so as to identify bandwidth problems in the associated link; and b) to generate a signal notifying a bandwidth problem, and a second set of virtual path agents each associated with a virtual path each virtual path agent being adapted to receive from monitor agents signals notifying bandwidth problems, and wherein each virtual path agent is adapted on receipt of a notification of a problem from a monitor agent:

c) to create a potential new route;

d) to generate a bid, the bid being based on the bandwidth to be moved to create the new route and the capacity of the new route once the bandwidth has been moved;

e) to compare bids received from other virtual path agents which have been notified of the problems by other monitor agents;

f) to select a best bid; and g) to generate instructions for the creation of the new route.

23. A management system for an ATM virtual path network having a plurality of physical connections in which the physical connections are provided by broad band links between ATM switches; and comprising electronic data processing means connectable to individual ATM switches in said ATM virtual path network, said electronic data processing means providing sets of inter-communicating distributed agents for carrying out management of the ATM switches in response to load and management requirements; and wherein there are first, second and third sets of distributed agents provided by said electronic data processing means for carrying out bandwidth management said broadband links of the system; and wherein:

a) each agent of said first set is associated with plurality of virtual paths and is adapted to respond to a lack of bandwidth in one of its associated virtual paths to generate a request to an agent of said third set to obtain bandwidth;

b) each agent of said second set is associated with the physical links of the network;

c) each one of said third set of agents is adapted in response to a request from an agent of said first set to request information regarding the availability of bandwidth on one or more of said physical links from the agents of said second set associated with the physical links, each agent of said second set responding to a request from an agent of said third set by sending to the agent of said third set information defining availability of bandwidth on its associated link; and d) wherein in response to bandwidth information received from each of the agents of said second set the agent of said third set is adapted to instruct each of the agents of said second set how bandwidth is to be released.

24. The management system according to claim 1, wherein once initial parameters have been set, the system operates entirely in response to measured load and management requirements.

25. The management system according to claim 1, wherein the first, second, and third set of inter-communicating distributed agents have no state and no learning capability.

26. A method according to claim 13, wherein once initial parameters have been set the management of the network operates entirely in response to measured load and management requirements.

27. A method according to claim 13, wherein the first, second, and third set of inter-communicating distributed agents have no state and no learning capability.

28. In an ATM virtual path network having a plurality of virtual paths, a plurality of ATM switches communicatively coupled to each other via physical connections provided by a plurality of broadband links, a method of managing the virtual path network comprising:

measuring current network load in individual broadband links and said virtual paths;

utilizing inter-communicating distributed agents for carrying out network management in response to measured network load;

monitoring the plurality of broadband links to identify a select broadband link having a bandwidth problem;

notifying to a plurality of virtual path agents associated with the virtual paths the selected broadband link; and enabling each of the -virtual path agents to identify and create new routes through the virtual path network over one or more of the broadband links, having spare capacity, bypassing the selected broadband link.

29. In an ATM virtual path network having a plurality of virtual paths, a plurality of ATM switches communicatively coupled to each other via physical connections provided by a plurality of broadband links, a system for managing the virtual path network, comprising:

electronic data processing means connectable to individual ATM switches for determining current network load in individual broadband links and virtual paths of the network;

first, second and third sets of inter-communicating distributed agents for carrying out management of the ATM switches in response to measured load and management requirements; and wherein each agent of said first set of distributed agents is associated with the plurality of virtual paths, said agent of the first set is adapted to respond to a lack of bandwidth in one of its associated virtual paths to generate a request to an agent of said third set of distributed agents to obtain bandwidth.

* * * * *